(12) United States Patent
Yokoyama

(10) Patent No.: US 11,594,910 B2
(45) Date of Patent: Feb. 28, 2023

(54) METHOD FOR ACQUIRING INFORMATION OF ENERGY STORAGE DEVICE, METHOD FOR CONTROLLING CHARGING, STATE ESTIMATION METHOD, LIFE ESTIMATION METHOD, ENERGY STORAGE SYSTEM MANUFACTURING METHOD, AND ENERGY STORAGE DEVICE MANAGEMENT APPARATUS

(71) Applicant: GS Yuasa International Ltd., Kyoto (JP)

(72) Inventor: Junpei Yokoyama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 155 days.

(21) Appl. No.: 16/769,889

(22) PCT Filed: Dec. 19, 2018

(86) PCT No.: PCT/JP2018/046746
§ 371 (c)(1),
(2) Date: Jun. 4, 2020

(87) PCT Pub. No.: WO2019/124427
PCT Pub. Date: Jun. 27, 2019

(65) Prior Publication Data
US 2021/0184488 A1 Jun. 17, 2021

(30) Foreign Application Priority Data
Dec. 19, 2017 (JP) .............................. JP2017-242899

(51) Int. Cl.
*H02J 7/00* (2006.01)
*H02J 7/14* (2006.01)
(Continued)

(52) U.S. Cl.
CPC ........ *H02J 7/007188* (2020.01); *H02J 7/005* (2020.01); *B60L 53/16* (2019.02); *B60L 53/62* (2019.02)

(58) Field of Classification Search
CPC .. H02J 7/0003; H02J 7/00032; H02J 7/00034; H02J 7/00036; H02J 7/00038; H02J 7/00045; H02J 7/0047
(Continued)

(56) References Cited

U.S. PATENT DOCUMENTS 6,275,009 B1 * 8/2001 Sakakibara ........... H02J 7/0071
320/134
10,109,889 B2 * 10/2018 Hattori ..................... H01M 4/62
(Continued)

FOREIGN PATENT DOCUMENTS

JP 2011-100691 A 5/2011
JP 2011-189768 A 9/2011
(Continued)

OTHER PUBLICATIONS

International Search Report (ISR) dated Jan. 29, 2019 issued in PCT/JP2018/046746.

*Primary Examiner* — Alexis B Pacheco
(74) *Attorney, Agent, or Firm* — Rankin, Hill & Clark LLP

(57) ABSTRACT

A method for acquiring information of a battery cell (11) includes a step (S101) of acquiring information pertaining to performance recovery accompanying the suspension of charging/discharging of the battery cell (11). Control pertaining to the battery cell (11) and estimation of a state of the battery cell (11) can be appropriately performed according to a type of battery cell (11).

15 Claims, 16 Drawing Sheets

(51) Int. Cl.
*B60L 53/62* (2019.01)
*B60L 53/16* (2019.01)

(58) Field of Classification Search
USPC ............................................. 320/106
See application file for complete search history.

(56) References Cited

U.S. PATENT DOCUMENTS

| | | | |
|---|---|---|---|
| 2012/0146582 A1 | 6/2012 | Lei et al. | |
| 2012/0259569 A1 | 10/2012 | Miwa et al. | |
| 2012/0301761 A1* | 11/2012 | Sasaki | H01M 10/0431 |
| | | | 429/94 |
| 2013/0143129 A1* | 6/2013 | Okamoto | H01M 10/056 |
| | | | 429/338 |
| 2015/0364731 A1* | 12/2015 | Yoo | H01M 50/00 |
| | | | 429/94 |
| 2016/0172639 A1* | 6/2016 | Seong | H01M 50/103 |
| | | | 429/179 |
| 2016/0248115 A1* | 8/2016 | Hatta | H01M 10/0525 |
| 2017/0077717 A1* | 3/2017 | Lundgren | H02J 7/007188 |
| 2017/0151880 A1* | 6/2017 | Nakashima | H02J 7/007 |
| 2017/0190258 A1* | 7/2017 | Hashimoto | B60L 53/20 |
| 2017/0259686 A1* | 9/2017 | Lee | H02J 7/04 |
| 2017/0259690 A1* | 9/2017 | Koga | B60L 50/62 |
| 2017/0309886 A1* | 10/2017 | Maeda | H01M 50/528 |
| 2017/0324084 A1* | 11/2017 | Lee | H01M 4/1391 |
| 2018/0034011 A1* | 2/2018 | Tsuda | H01M 10/0567 |
| 2018/0143259 A1* | 5/2018 | Kim | G01R 31/392 |
| 2019/0195958 A1* | 6/2019 | Suzuki | H01M 10/0585 |
| 2019/0288347 A1* | 9/2019 | Yokoyama | B60L 58/13 |
| 2020/0067140 A1* | 2/2020 | Kikuchi | H01M 4/505 |
| 2020/0295339 A1* | 9/2020 | Kwak | H01M 10/0431 |

FOREIGN PATENT DOCUMENTS

| | | |
|---|---|---|
| JP | 2012-125142 A | 6/2012 |
| JP | 2013-196820 A | 9/2013 |
| JP | 2015-207371 A | 11/2015 |
| JP | 2015-210991 A | 11/2015 |
| JP | 2016-219257 A | 12/2016 |

* cited by examiner

Fig. 14

| Type | t [h] | $V_0$ [V] | $V_t$ [V] | $\Delta V$ [mV] | $\Delta V \cdot t^{-1}$ [mV·min.$^{-1}$] | $0.8\Delta V$ [mV] | $t_{0.8\Delta V}$ [sec.] |
|---|---|---|---|---|---|---|---|
| Type 2 (High compression vertically wound type) | 3 | 2.750 | 3.072 | 322 | 1.79 | 257 | 429 |
| | 6 | 2.750 | 3.039 | 289 | 0.80 | 231 | 539 |
| | 12 | 2.750 | 3.029 | 279 | 0.39 | 223 | 714 |
| | 24 | 2.750 | 3.021 | 271 | 0.19 | 216 | 812 |
| TYPE 4 (High compression horizontally wound type) | 3 | 2.750 | 3.212 | 462 | 2.56 | 369 | 974 |
| | 6 | 2.750 | 3.210 | 460 | 1.28 | 368 | 1060 |
| | 12 | 2.750 | 3.211 | 461 | 0.64 | 369 | 1105 |
| | 24 | 2.750 | 3.212 | 462 | 0.32 | 370 | 1122 |

METHOD FOR ACQUIRING INFORMATION OF ENERGY STORAGE DEVICE, METHOD FOR CONTROLLING CHARGING, STATE ESTIMATION METHOD, LIFE ESTIMATION METHOD, ENERGY STORAGE SYSTEM MANUFACTURING METHOD, AND ENERGY STORAGE DEVICE MANAGEMENT APPARATUS

TECHNICAL FIELD

The technology disclosed in the present specification relates to a method for acquiring information of an energy storage device, a method for controlling charging, a state estimation method, a life estimation method, an energy storage system manufacturing method, and an energy storage device management apparatus

BACKGROUND ART

Conventionally, there is known a technique of suppressing swelling of an energy storage device by compressing the energy storage device (for example, see Patent Document 1). The energy storage apparatus described in Patent Document 1 suppresses the swelling of the energy storage device by compressing the energy storage device from the outside by a compression unit.

PRIOR ART DOCUMENT

Patent Document

Patent Document 1: JP-A-2016-219257

SUMMARY OF THE INVENTION

Problems to be Solved by the Invention

Energy storage devices such as lithium ion secondary batteries are required to increase its discharging capacity and its energy density (hereinafter, also referred to as "performance"). For example, an energy storage device for a vehicle such as an electric vehicle (EV), a hybrid electric vehicle (HEV), or a plug-in hybrid electric vehicle (PHEV), which emits a vehicle driving force, is required to have a significantly high capacity. One of the means for improving the performance is to increase the filling rate (hereinafter referred to as "volume occupancy") of an electrode assembly constituted by a positive electrode plate, a negative electrode plate, and an insulator between them into the case.

When the volume occupancy per energy storage device increases, the expansion of the energy storage device accompanying charging also increases. Therefore, when the volume occupancy of the energy storage device increases, a higher compression force is required to suppress the expansion. However, not all energy storage devices necessarily require a high compression force, and some energy storage devices do not require the high compression force. That is, energy storage devices include a high compression type to which a high compression force is applied and a low compression type to which a relatively weak compression force or no compression force is applied.

Energy storage devices are classified into various types from various viewpoints. Conventionally, there is room for improvement in appropriately performing control related to the energy storage device, estimation of the state of the energy storage device, and the like according to the type of energy storage device.

The present specification discloses a technique that enables appropriate control of an energy storage device, estimation of the state of the energy storage device, and the like according to the type of energy storage device.

Means for Solving the Problems

The method for acquiring information of an energy storage device disclosed in the present specification includes a step of acquiring information pertaining to performance recovery accompanying suspension of charging/discharging of the energy storage device.

Advantages of the Invention

According to the technology disclosed in the present specification, it is possible to appropriately perform control related to an energy storage device, estimation of the state of the energy storage device, and the like according to the type of energy storage device.

BRIEF DESCRIPTION OF THE DRAWINGS

FIG. 14 is a table showing the results of voltage recovery during suspension.

MODE FOR CARRYING OUT THE INVENTION

Outline of this Embodiment

Figure 1:
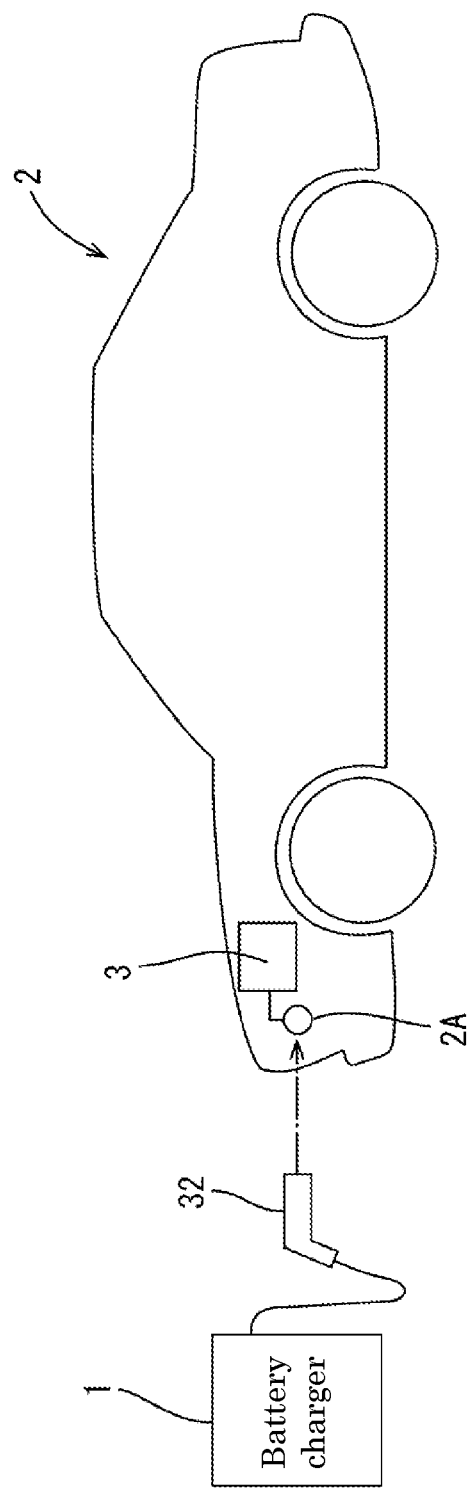
FIG. 1 is a schematic view of a battery cell, a vehicle, and a battery charger.

A method for acquiring information of an energy storage device disclosed in the present specification includes a step of acquiring information pertaining to performance recovery accompanying the suspension of charging/discharging of the energy storage device.

As a result of earnest studies, the inventors of the present application have found that performance recovery accompanying the suspension of charging/discharging varies depending on the type of energy storage device. According to the above-described information acquisition method, by using the information pertaining to the performance recovery accompanying the suspension of charging/discharging of the energy storage device (for example, the information representing the type of energy storage device), it is possible to determine an appropriate suspension time according to the type of energy storage device and appropriately estimate the state of the energy storage device.

The information pertaining to the performance recovery may include information pertaining to a compression force that compresses the energy storage device.

The inventors of the present application have paid attention to the fact that the performance of an energy storage device is more difficult to recover under high compression than under low compression, and has made the following hypothesis about the behavior of the energy storage device when a high compression force is applied.

When the energy storage device is exposed to high compression, an amount of retained electrolyte solution in an electrode mixture layer and an amount of retained electrolyte solution in a void inside a separator decrease, and ion conductivity in the energy storage device decreases. Therefore, ion concentration gradient is generated from an electrode surface to an electrolyte solution bulk layer (electrolyte solution at a position apart from the electrode surface). Further, ion concentration gradient is generated from a vicinity of an electrode base material in the electrode to a surface of the mixture layer.

When ion concentration gradient is generated, uneven distribution of the ions causes a reaction to proceed nonuniformly at various points in the mixture layer, so that diffusion of ions in the mixture layer also becomes nonuniform immediately after the discharge. Therefore, a certain long suspension time is required until the ion diffusion in the mixture layer is made uniform and the performance of the energy storage device is recovered.

On the other hand, a low compression type to which a relatively weak compression force or no compression force is applied has a large amount of retained electrolyte solution, and the electrolyte solution is evenly distributed. For this reason, compared to a high compression type to which a high compression force is applied, the ion concentration gradient is suppressed. Therefore, the suspension time required for performance recovery is shorter than that for the high compression type.

When the inventors of the present application conducted an experiment based on such a hypothesis, it was found that the hypothesis was valid.

According to the above-described information acquisition method, by acquiring information pertaining to the compression force that compresses the energy storage device, it is possible to properly perform, for example, control regarding the energy storage device and estimation of the state of the energy storage device according to the compression force that compresses the energy storage device.

The information pertaining to the performance recovery may include information pertaining to the type of electrode assembly incorporated in the energy storage device.

The inventors of the present application have paid attention to the fact that, under high compression, an energy storage device incorporating a vertically wound electrode assembly is less likely to recover the performance than an energy storage device incorporating a horizontally wound electrode assembly, and has made the following hypothesis concerning the behavior of the energy storage device.

High compression type energy storage devices vary in the amount of electrolyte solution retained in the electrode assemblies depending on the types of electrode assemblies incorporated in the energy storage devices. For example, comparing an energy storage device incorporating a vertical wound electrode assembly and an energy storage device incorporating a horizontal wound electrode assembly reveals that, when a high compression force is applied, the pressure distribution in the electrode assembly due to the compression force becomes uneven in the vertically wound type. Therefore, a certain long suspension time is required until the performance of the energy storage device is recovered.

On the other hand, in the horizontally wound type, the pressure distribution in the electrode assembly due to the compression force tends to be more uniform than in the vertically wound type. Therefore, the horizontally wound type has a large amount of retained electrolyte solution and the electrolyte solution is uniformly distributed, and the ion concentration gradient is suppressed as compared with the vertically wound type. Therefore, the horizontally wound type has a shorter suspension time required for performance recovery than the vertically wound type.

When the inventors of the present application conducted an experiment based on such a hypothesis, it was found that the hypothesis was valid.

According to the above information acquisition method, by acquiring information pertaining to the type of electrode assembly of the energy storage device (information having a correlation with the electrolyte solution retention amount), it is possible to properly control the energy storage device, estimate the state of the energy storage device, and the like.

A method for controlling charging of an energy storage device disclosed in the present specification includes the method for acquiring information of an energy storage device described in any one of claims 1 to 3 and a step of controlling charging of the energy storage device based on information pertaining to the performance recovery.

According to the above charge control method, appropriate charging can be performed according to the type of energy storage device (for example, the suspension time can be appropriately determined).

The above method may include a step of acquiring information pertaining to a suspension time until charging is started after the energy storage device is discharged based on the information pertaining to the performance recovery and a step of causing a battery charger to start charging the energy storage device in a suspension time corresponding to the information pertaining to the suspension time after the energy storage device is discharged.

According to the above charge control method, by using the information pertaining to the performance recovery accompanying the suspension of charging/discharging of the energy storage device, it is possible to determine an appropriate suspension time according to the type of energy storage device.

The control unit may change the suspension time according to a deterioration in the energy storage device.

According to the above charge control method, a suspension time can be appropriately determined according to a deterioration in the energy storage device.

An energy storage device state estimation method disclosed in the present specification includes the method for acquiring information of an energy storage device described in any one of claims 1 to 3 and a step of estimating a state of the energy storage device based on information pertaining to the performance recovery.

According to the above state estimation method, the state of the energy storage device (for example, open circuit voltage (OCV), state of charge (SOC), state of health (SOH), or remaining life) can be appropriately estimated according to the type of energy storage device.

An energy storage device life estimation method disclosed in the present specification includes the method for acquiring information of an energy storage device described in any one of claims 1 to 3 and a step of estimating a life of the energy storage device based on information pertaining to the performance recovery.

According to the above life estimation method, by using the information pertaining to the performance recovery accompanying the suspension of charging/discharging of the energy storage device, it is possible to properly estimate the life of the energy storage device.

An energy storage device manufacturing method disclosed in the present specification includes the method for acquiring information of an energy storage device described in any one of claims 1 to 3 and a step of designing an energy storage system based on information pertaining to the performance recovery and an assumed usage pattern of the energy storage device.

According to the above-mentioned manufacturing method, in designing a large-scale power storage system using a large number of energy storage devices, a more compact and inexpensive energy storage system can be implemented by determining the number of energy storage devices required to satisfy system requirements and constructing a control system in consideration of information pertaining to the performance recovery accompanying the suspension of charging/discharging of the energy storage devices.

An energy storage device management apparatus disclosed in the present specification includes an acquisition unit that acquires information pertaining to performance recovery accompanying the suspension of charging/discharging of the energy storage device and a control unit that performs at least one of charge control, discharge control, state estimation, and life estimation of the energy storage device based on the information pertaining to the performance recovery acquired by the acquisition unit.

According to the management apparatus described above, it becomes possible to appropriately control the energy storage device, estimate the state of the energy storage device, and the like according to the type of energy storage device.

The technology disclosed in the present specification can be implemented in various aspects such as a controller, a control method, a computer program for implementing functions of the controller or method, and a recording medium recording the computer program.

First Embodiment

The first embodiment will be described with reference to FIGS. 1 to 12. In the following description, a long side direction, a depth direction, and an up and down direction of a battery module 10 shown in FIG. 2 in a state where the battery module 10 is placed horizontally without tilting with respect to an installation surface will be respectively referred to as an X direction, a Y direction, and a Z direction.

(1) System Overview

The battery charger 1 according to the embodiment will be described with reference to FIG. 1. In FIG. 1, a vehicle 2 is an electric vehicle (EV), a hybrid electric vehicle (HEV), a plug-in hybrid electric vehicle (PHEV), or the like. The vehicle 2 is equipped with a battery 3 that generates a vehicle driving force by supplying electric power to an electric motor of the vehicle 2. Although not shown, the vehicle may be a two-wheeled vehicle, a three-wheeled vehicle, a construction machine (a crane vehicle or an excavator car), a railway vehicle, an automated guided vehicle (AGV), or the like, equipped with an energy storage device (battery or capacitor) that generates a vehicle driving force. The battery charger 1 is provided in a home, an office, a charging station, or the like to charge the battery 3.

The vehicle 2 is provided with a charging inlet 2A to which a charging connector 32 of the battery charger 1 is detachably connected. The battery 3 is charged by the battery charger 1 connected via the charging inlet 2A. The charging inlet 2A is also connected to an ECU of the vehicle 2 inside the vehicle 2. The battery charger 1 can also communicate with the ECU via the charging inlet 2A.

(1-1) Battery Module

Figure 2:
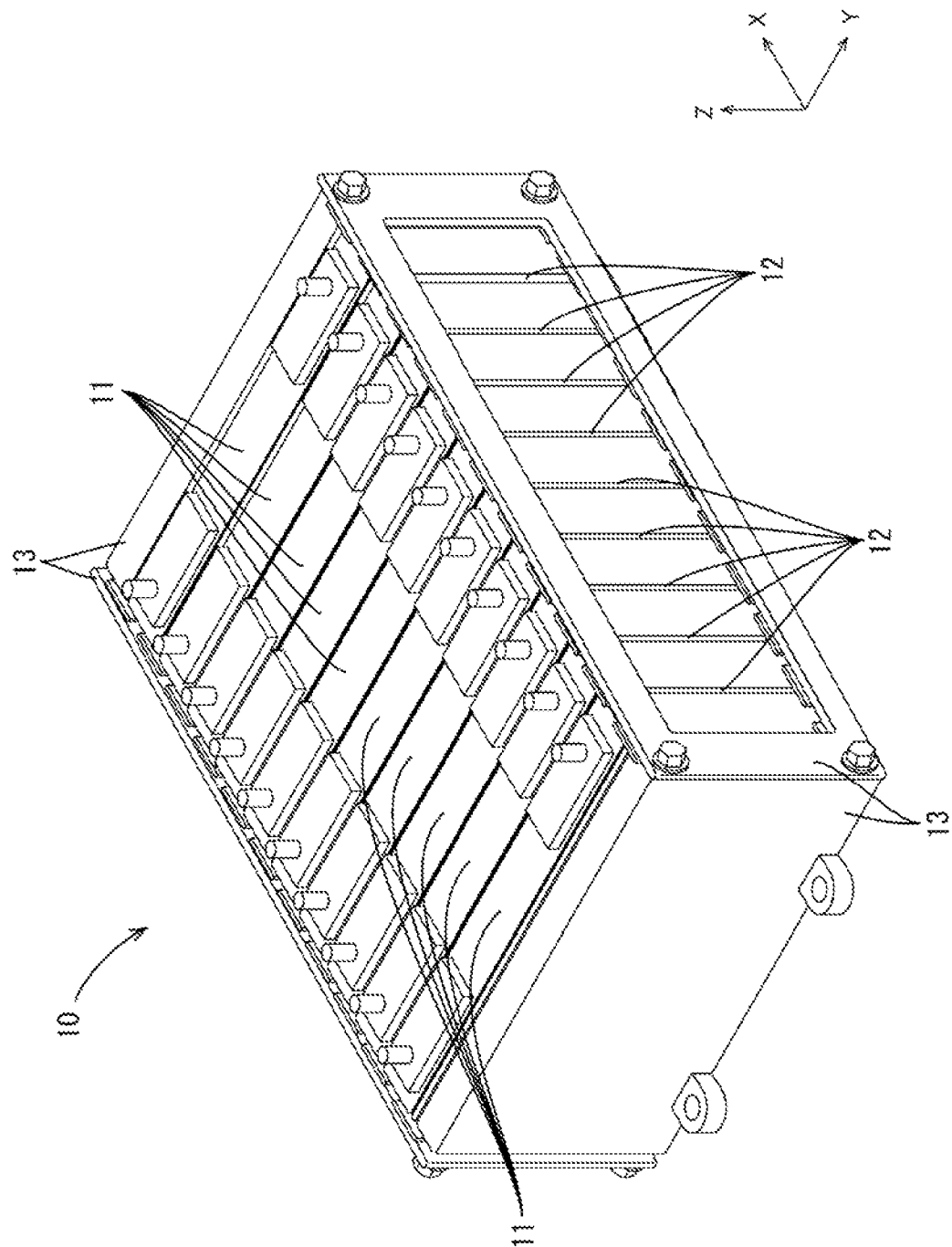
FIG. 2 is a perspective view of a battery module.

The battery module 10 housed inside the battery 3 will be described with reference to FIG. 2. The battery module 10 includes pluralities of battery cells 11, spacers 12 and a restraining portion 13 which are stacked in the X direction.

Figure 3:
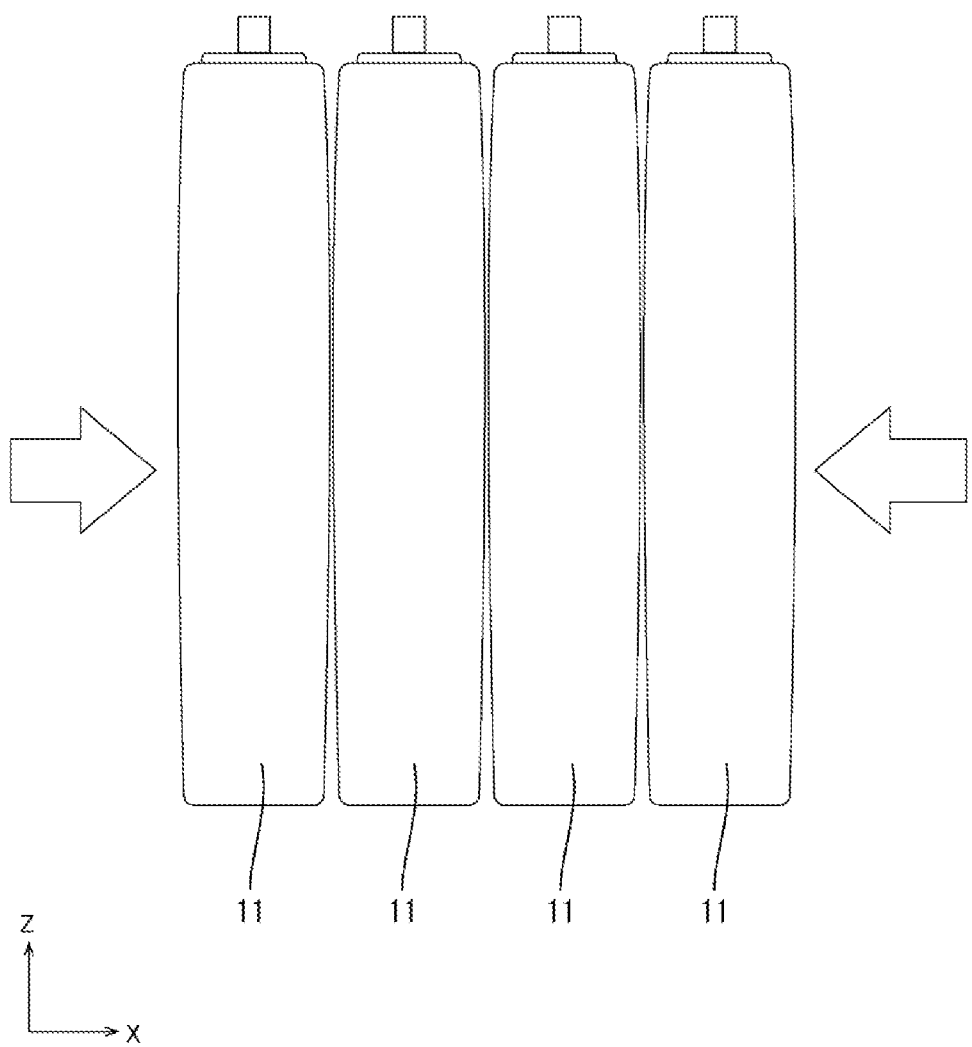
FIG. 3 is a schematic view showing a state in which a plurality of battery cells are compressed from a stacking direction.

Each battery cell 11 is a secondary battery that can be repeatedly charged and discharged, and is, for example, a lithium ion battery. The plurality of battery cells 11 are restrained by the restraining portion 13 while being compressed in the stacking direction (X direction) in order to suppress expansion. FIG. 3 schematically shows a state in which the plurality of battery cells 11 are compressed in the stacking direction.

Figure 4:
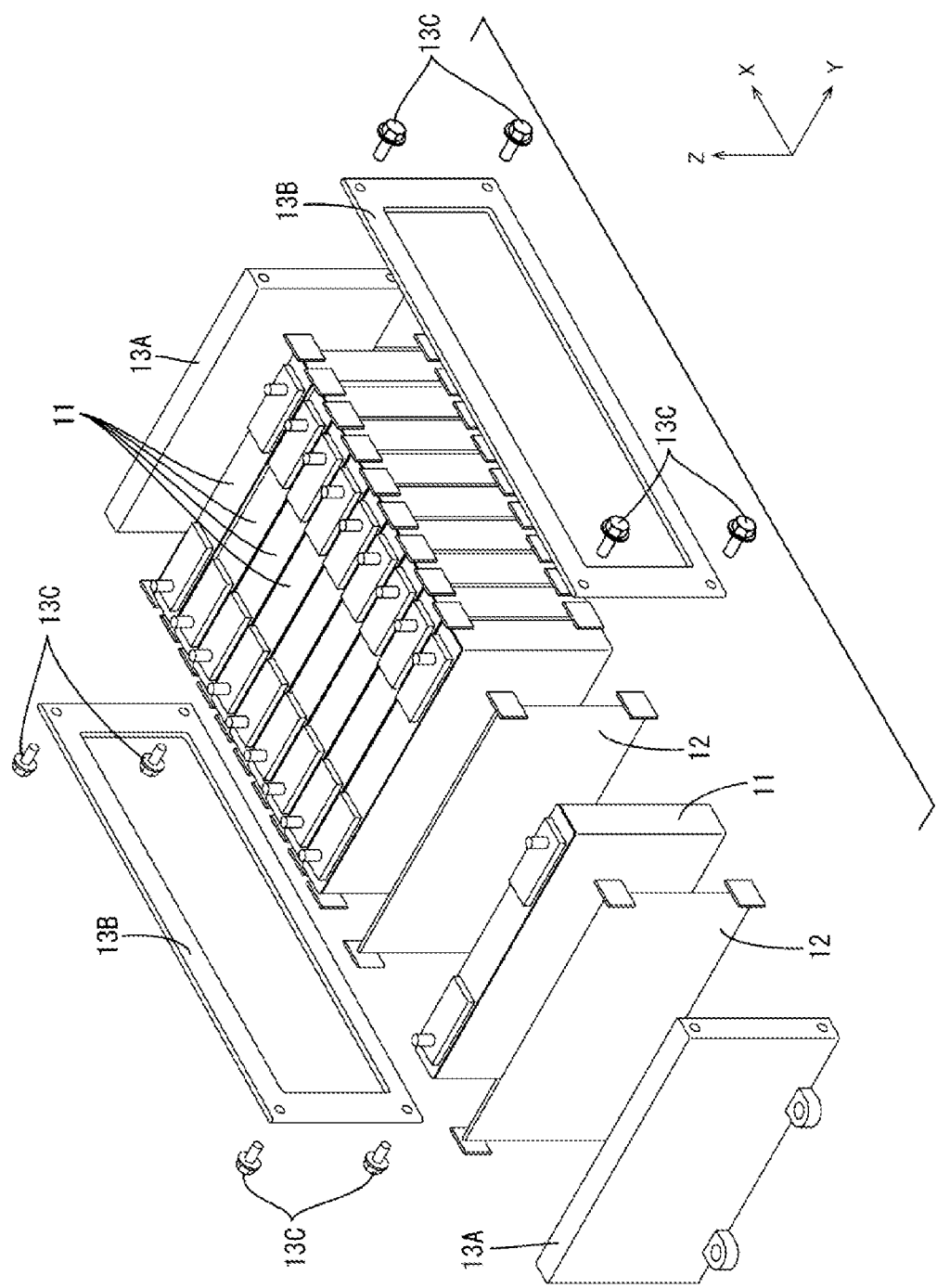
FIG. 4 is an exploded perspective view of the battery module.

The spacers 12 and the restraining portion 13 will be described with reference to FIG. 4. The spacers 12 are resin members that are arranged between the adjacent battery cells 11 and between the battery cells 11 and end plates 13A of the restraining portion 13 described later to insulate them. The spacer 12 need not necessarily be provided.

The restraining portion 13 includes the pair of end plates 13A and a pair of coupling members 13B. The pair of end plates 13A are for sandwiching the plurality of battery cells 11 and the plurality of spacers 12 from the X direction. The end plates 13A are made of metal such as stainless steel from the viewpoint of strength. In the low compression type, the end plates are sometimes made of resin.

The pair of coupling members 13B are metal members that couple the end plates 13A to each other and restrain the plurality of battery cells 11 and the plurality of spacers 12 in a compressed state. Each coupling member 13B is formed in a rectangular frame shape that is long in the X direction. The coupling members 13B restrain the plurality of battery cells 11 in a compressed state by fastening both sides of each coupling member 13B in the X direction with bolts 13C while the plurality of battery cells 11 and the plurality of spacers 12 are compressed by the pair of end plates 13A in the stacking direction. The restraining portion 13 may have any configuration as long as it can restrain the plurality of battery cells 11 while being compressed in the stacking direction.

(1-2) Battery Cell

Figure 5:
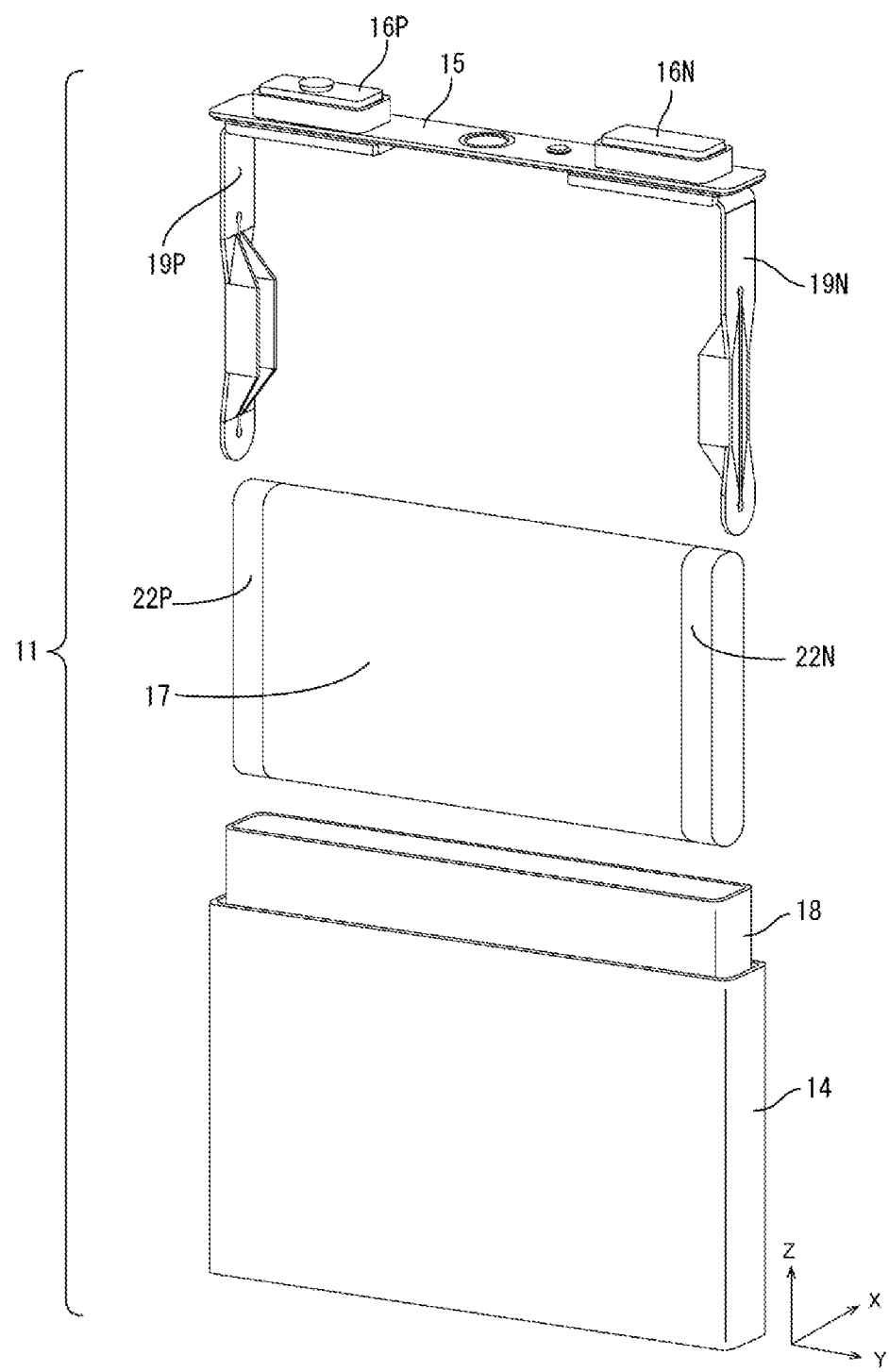
FIG. 5 is an exploded perspective view of the battery cell incorporating a vertically wound electrode assembly.

As shown in FIG. 5, each battery cell 11 includes a case body 14 and a lid member 15. The case body 14 is formed of a metal such as an aluminum alloy or stainless steel into a box shape that opens upward. More specifically, the case body 14 is a bottomed rectangular cylinder having a short side in the X direction and a long side in the Y direction.

The lid member 15 is a metal member such as an aluminum alloy or stainless steel, and is a rectangular plate member elongated in the Y direction. The lid member 15 corresponds to the size of the opening of the case body 14, and an edge of a back surface is welded to an upper end of the case body 14 over the entire circumference to seal the opening of the case body 14. A positive electrode terminal 16P and a negative electrode terminal 16N are provided on an upper surface of the lid member 15. These terminals are provided so as to extend through the lid member 15.

The case body 14 houses an electrode assembly 17, an insulating cover 18, a positive electrode current collector 19P, a negative electrode current collector 19N, an electrolyte solution 23 (see FIG. 9), and the like.

Figure 6:
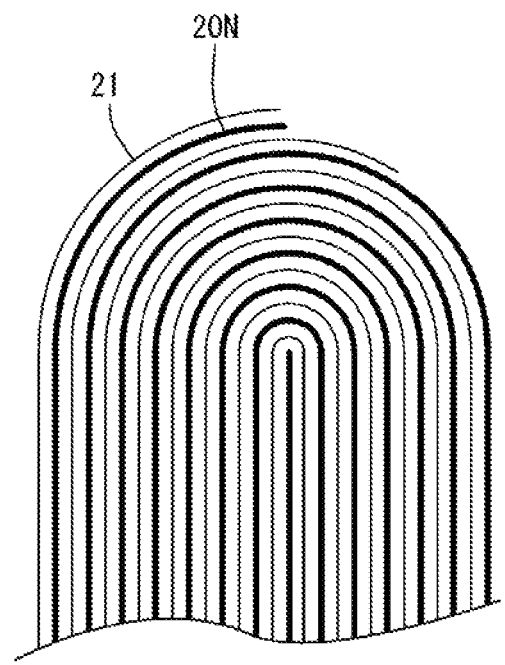
FIG. 6 is a side view of an electrode assembly.
Figure 6:
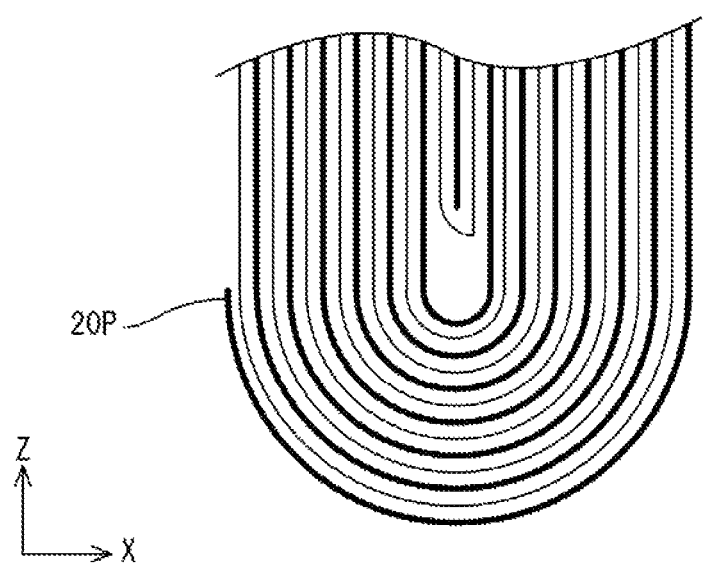

The electrode assembly 17 is housed in the case body 14 with the insulating cover 18 covering the entire body. As shown in FIG. 6, the electrode assembly 17 is wound in a flat shape while shifting the position in the Y direction (the direction perpendicular to the drawing surface in FIG. 6) with the separator 21 sandwiched between a positive electrode sheet 20P and a negative electrode sheet 20N. As will be described later in detail, the form of the electrode assembly 17 includes a vertically wound type and a horizontally wound type. FIGS. 5 and 6 show the vertically wound electrode assembly 17 wound in the vertical direction (Z direction).

The positive electrode sheet 20P is obtained by making the surface of an electrode base material (a metal foil made of aluminum or an aluminum alloy) support a positive active material (hereinafter, also referred to as a mixture layer). As a material for the positive active material, lithium iron phosphate, lithium cobalt oxide, lithium nickel oxide, lithium manganate, ternary lithium obtained by replacing part of lithium cobalt oxide with nickel and manganese, or the like can be used. The material for the positive active material is not limited to them.

The negative electrode sheet 20N is obtained by making the surface of an electrode base material (a metal foil made of copper or a copper alloy) support a negative active material (hereinafter, also referred to as a mixture layer). As the material of the negative active material, graphite (hard carbon, soft carbon), silicon or the like can be used. Soft carbon is graphitizable carbon obtained by calcining a polymer (e.g., thermoplastic resin, petroleum-based or coal-based tar or pitch) in which a graphite crystal structure is easily developed by high temperature treatment. Hard carbon is non-graphitizable carbon obtained by calcining a polymer in which a graphite crystal structure is hard to develop. Soft carbon has a larger charging capacity than hard carbon, but has the property of expanding more easily than hard carbon. The material for the negative active material is not limited to them, and may include, for example, titanium.

The separator 21 is a resin sheet for insulating the positive electrode sheet 20P and the negative electrode sheet 20N. Minute pores for allowing lithium ions to pass through are formed in the separator 21.

As shown in FIG. 5, a positive electrode current collector foil 22P having an exposed electrode base material is formed on one end portion of the positive electrode sheet 20P. A negative electrode current collector foil 22N having an exposed electrode base material is formed on the other end portion of the negative electrode sheet 20N (see FIG. 6).

The positive electrode current collector 19P is formed by bending a conductive metal member, and is connected to the positive electrode terminal 16P from the back surface side of the lid member 15. The positive electrode current collector 19P is provided with a pair of opposite walls. The pair of opposite walls are welded to the positive electrode current collector foil 22P while being overlapped with the positive electrode current collector foil 22P of the electrode assembly 17 in the X direction. The same applies to the negative electrode current collector 19N.

(2) Battery Charger

Figure 7:
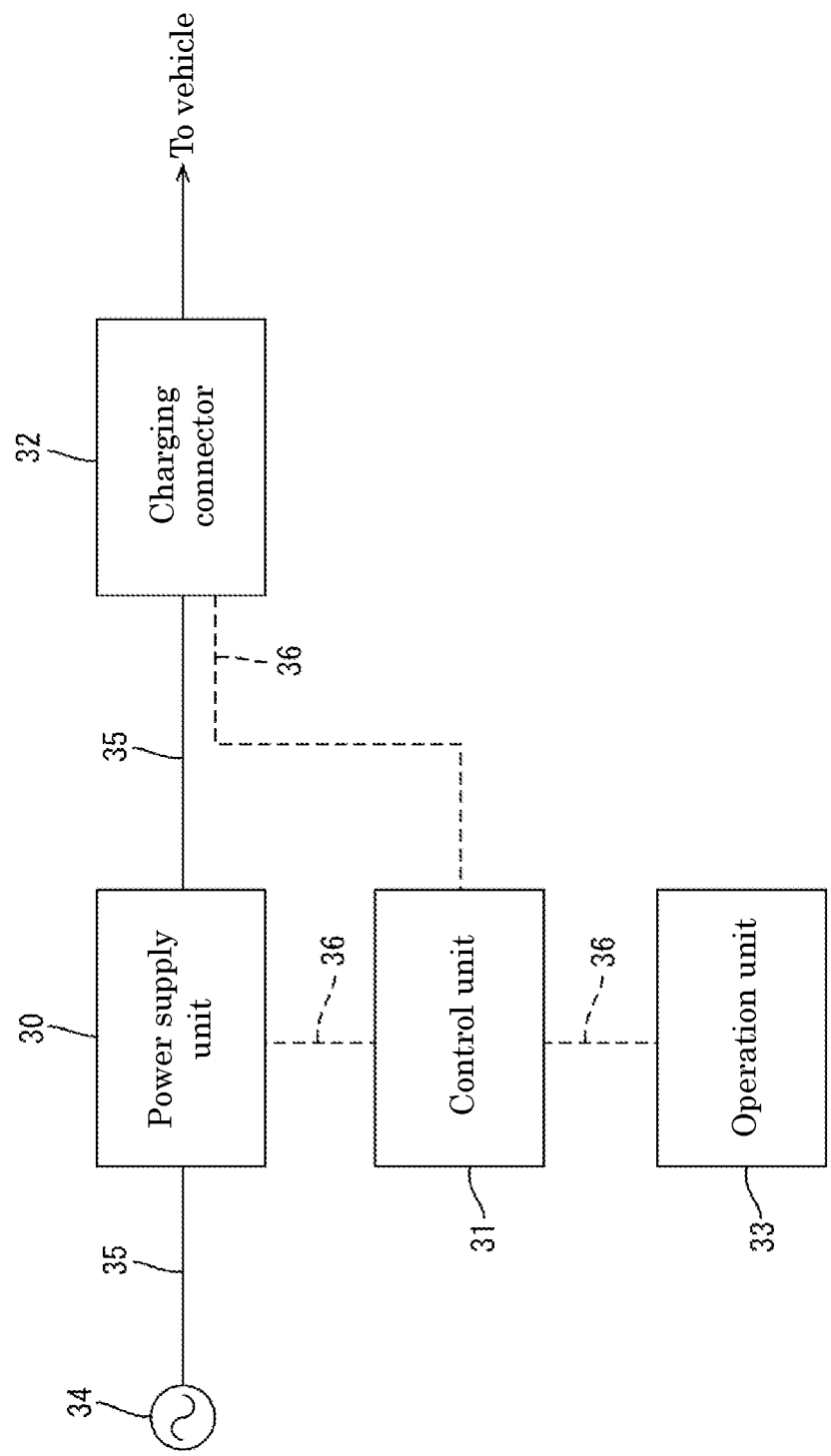
FIG. 7 is a block diagram showing an electrical configuration of the battery charger.

The battery charger 1 will be described with reference to FIG. 7. The battery charger 1 includes a power supply unit 30, a control unit 31, a charging connector 32 (an example of an acquisition unit), and an operation unit 33.

The power supply unit 30 includes an AC/DC converter that converts 200 V AC power supplied from a commercial power supply 34 into 360 V DC power and a DC/DC converter that converts the DC power converted by the AC/DC converter into, for example, 50 to 500 V DC power. The voltages such as 200 V, 360 V, and 50 to 500 V described above are examples, and the voltage is not limited to them.

The charging connector 32 is detachably connected to the charging inlet 2A of the vehicle 2. The charging connector 32 is connected to the power supply unit 30 via a power line 35, and is also connected to the control unit 31 via a communication line 36.

The control unit 31 includes a CPU, ROM, and RAM. The control unit 31 controls each unit of the battery charger 1 by executing the control program stored in the ROM. Specifically, the control unit 31 receives various information such as a charge voltage, a current value, and a charge permission flag from the ECU of the vehicle 2 via the charging connector 32, and controls the power supply unit 30 based on the information.

The control unit 31 may include an application specific integrated circuit (ASIC) or a field programmable gate array (FPGA) instead of or in addition to the CPU.

The operation unit 33 has a liquid crystal panel and a touch panel. The liquid crystal panel displays the charge state, charge voltage, current, power amount, and the like of the battery 3. A driver of the vehicle 2 can operate the touch panel to make various settings regarding charging.

(3) Battery Cell Type

The battery cells 11 are classified into various types from various viewpoints. Here, the following two viewpoints will be described as an example.

Viewpoint 1: Magnitude of Compression Force of Battery Cells

The force with which the restraining portion 13 compresses the battery cells 11 is not constant, but changes depending on, for example, the number of times charge and discharge are repeated. Here, in the SOC range of 0% to 100%, a state in which the minimum value of the compression force during the period from the beginning of life (BoL) to the end of life (EoL) of the battery cell 11 is 0.03 MPa or more is defined as high compression, and a state in which the minimum value is less than 0.03 MPa is defined as low compression. The criterion for judging the magnitude of the compression force is not limited to 0.03 MPa, and can be appropriately determined.

Viewpoint 2: Form of Electrode Assembly

Figure 8:
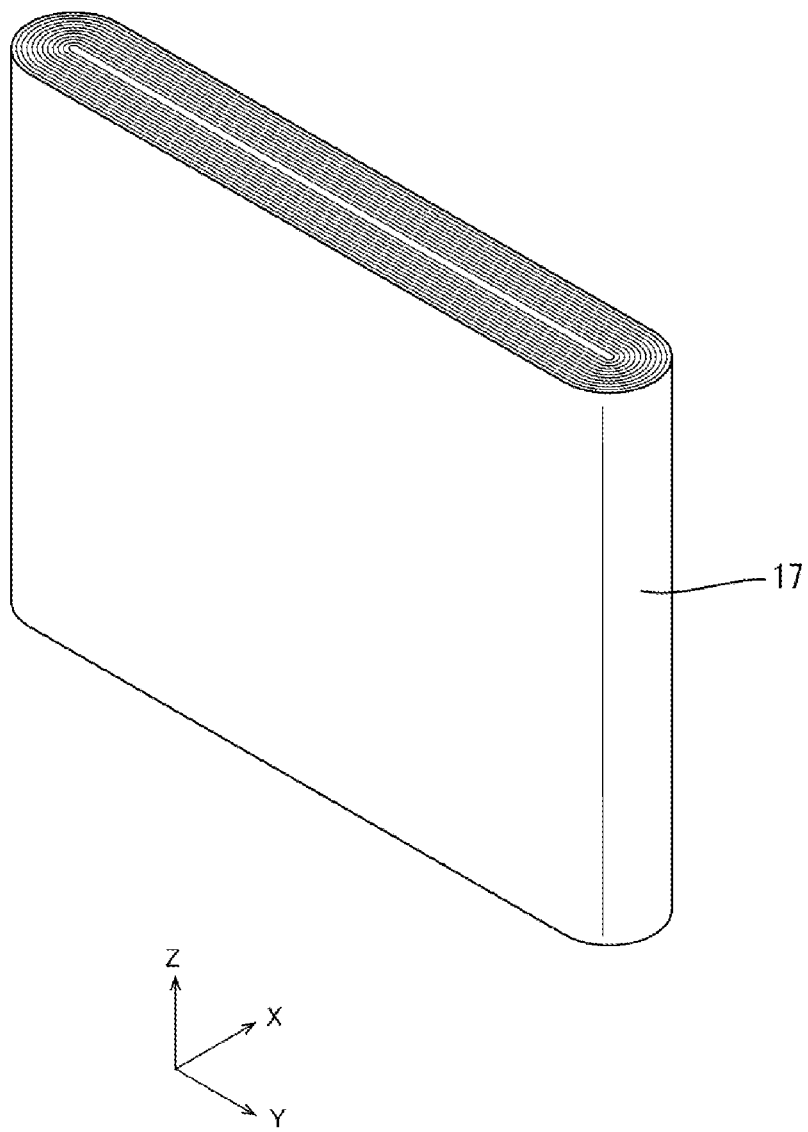
FIG. 8 is a schematic view showing a horizontally wound electrode assembly.
Figure 9:
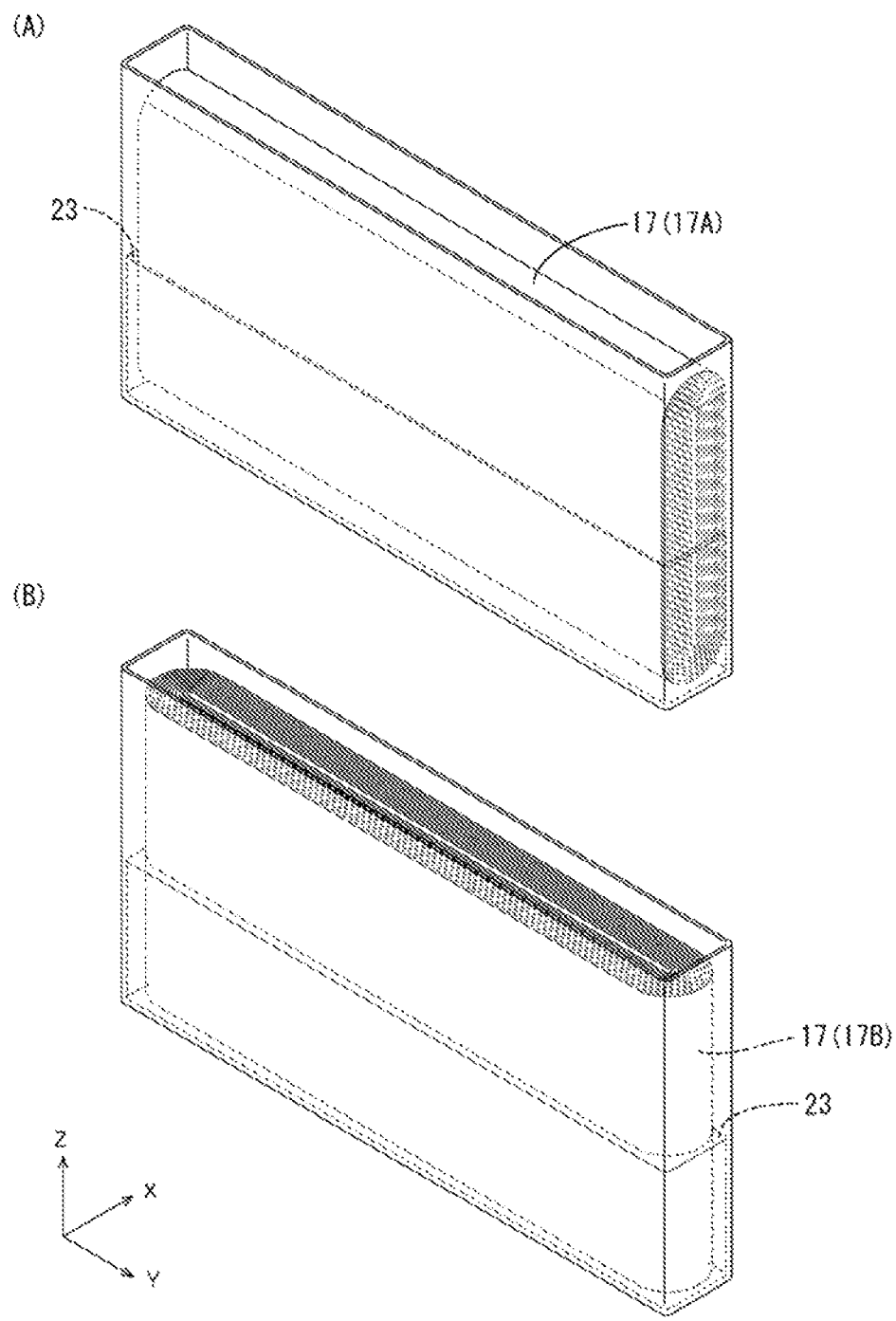
FIG. 9(A) is a schematic view showing the vertically wound electrode assembly.
FIG. 9(B) is a schematic view showing the horizontally wound electrode assembly.
Figure 16:
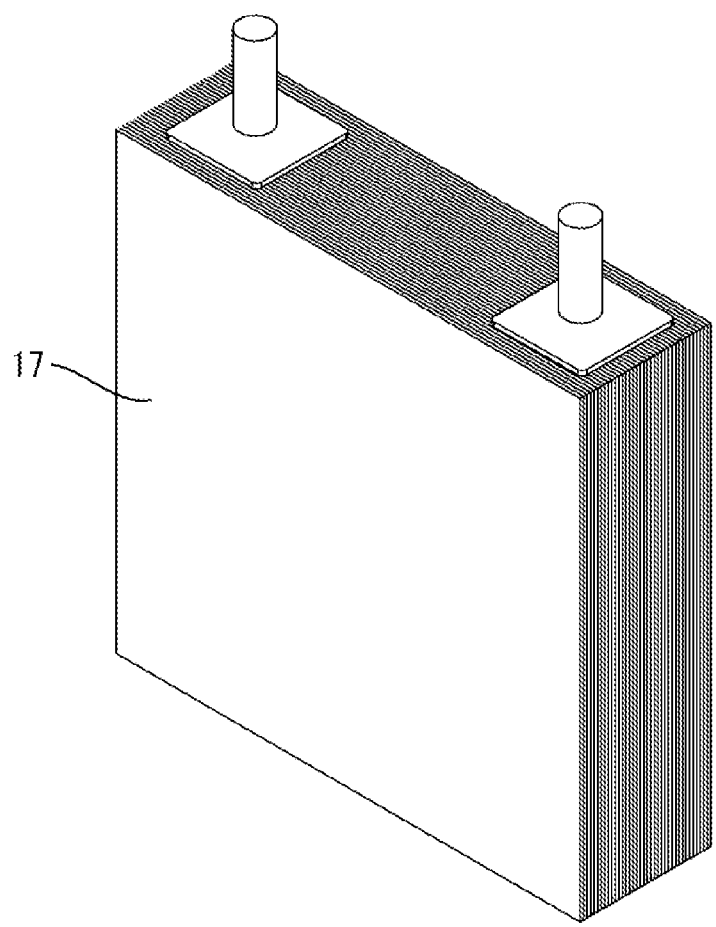
FIG. 16 is a schematic view of a stack type electrode assembly.

The form (type) of the electrode assembly 17 includes a wound type having the positive electrode sheet 20P and the negative electrode sheet 20N wound and a stack type having a flat positive electrode plate and a negative electrode plate alternately stacked on each other (see FIG. 16). The wound type includes a vertically wound type that is wound in the vertical direction as shown in FIG. 5 and a horizontally wound type that is wound in the horizontal direction as shown in FIG. 8. In order to facilitate understanding, in the following description, a vertically wound type and a horizontally wound type will be described as examples of the form of the electrode assembly 17.

From the above two viewpoints, there are the following four types of battery cells 11.

Type 1: Low compression vertically wound type
Type 2: High compression vertically wound type
Type 3: Low compression horizontally wound type
Type 4: High compression horizontally wound type (4) Battery Cell Performance Recovery Accompanying Suspension of Charging/Discharging The suspension of charging/discharging means a state in which the battery cell 11 is not charged by the battery charger 1 and is not discharged to the electric motor or any in-vehicle device. Even in this state, a minute dark current sometimes flows in the battery cell 11. Therefore, in this embodiment, a state in which the current value of a current flowing through the battery cell 11 is less than a predetermined reference value is defined as the suspension of charging/discharging.

Generally, when the battery cell 11 is charged/discharged, the charging capacity (an example of performance) decreases due to the generation of ion concentration gradient, but the charging capacity is recovered by uniforming the ion concentration during the suspension time after charging/discharging. The recovery of the charging capacity after charging/discharging progresses as the suspension time increases. Conversely, the recovery of the charging capacity after charging/discharging progresses less as the suspension time decreases.

However, the charging capacity does not completely recover even if the suspension time is extended, and the charging capacity gradually decreases when charge and discharge are repeated. In other words, the battery cell 11 gradually deteriorates. The deterioration of the battery cell 11 becomes faster as the recovery of the charging capacity after charging/discharging is smaller. As described above, the recovery of the charging capacity after charging/discharging is smaller as the suspension time is shorter. Therefore, if the suspension time after charging/discharging is shorter, the deterioration of the battery cell 11 is accelerated when the charge/discharge is repeated.

Therefore, in order to suppress the deterioration of the battery cells 11, it is desirable to extend the suspension time after charging/discharging. However, if the suspension time is increased, it is highly likely that charging is not completed when the driver uses the vehicle 2, and the convenience for the driver is reduced.

According to the experience of the inventors of the present application, the recovery of the charging capacity after charge/discharge may differ depending on the type of battery cell 11 even if the suspension time is the same. In other words, the suspension time required for recovery of the charging capacity accompanying the suspension of charging/discharging sometimes varied depending on the type of battery cell 11. The inventors of the present application have made the following two hypotheses as a result of earnest studies.

(4-1) Hypothesis 1

The inventors of the present application have paid attention to the fact that the battery cell 11 under high compression is less likely to recover the charging capacity than the battery cell 11 under low compression, and made a hypothesis concerning the behavior of the battery cell 11 when a high compression force is applied.

When the battery cells 11 is exposed to high compression, the amount of retained electrolyte solution in the electrode mixture layer and the amount of retained electrolyte solution in the void inside the separator 21 decrease, and the ion conductivity in the battery cells 11 decreases. Therefore, ion concentration gradient is promoted from the electrode surface to the electrolyte solution bulk layer (electrolyte solution 23 at a position apart from the electrode surface). Further, ion concentration gradient is generated from a vicinity of an electrode base material in the electrode to a surface of the mixture layer.

When ion concentration gradient is generated, uneven distribution of the ions causes a reaction to proceed non-uniformly at various points in the mixture layer, so that diffusion of ions in the mixture layer also becomes nonuniform immediately after the discharge. Therefore, in order to recover the performance, it is necessary to make the ion distribution uniform in the mixture layer. That is, a certain long suspension time is required until the charging capacity is recovered.

On the other hand, the type that does not exert a compression force or the low compression type that exerts a relatively weak compression force has a large amount of electrolyte solution and suppresses the ion concentration gradient because the electrolyte solution 23 is evenly distributed as compared with the high compression type. Therefore, the low compression type has a shorter suspension time than the high compression type, which is required for recovery of the charging capacity accompanying the suspension of charging/discharging.

(4-2) Hypothesis 2

The inventors of the present application have paid attention to the fact that, under high compression, the battery cell 11 incorporating the vertically wound electrode assembly 17 is less likely to recover the charging capacity than the battery cell 11 incorporating the horizontally wound electrode assembly 17, and made the following hypothesis regarding the behavior of the energy storage device when a high compression force is applied.

When a high compression force is applied, the amount of retained electrolyte solution in the electrode assembly 17 in FIG. 6 changes due to the expansion/contraction of the electrode assembly 17 accompanying charging/discharging. As shown in FIGS. 9(A) and 9(B), a vertically wound electrode assembly 17A allows the electrolyte solution 23 to flow in and out from both sides in the lateral direction (Y direction), while a horizontally wound electrode assembly 17B allows the electrolyte solution 23 to flow in and out from the bottom surface side. Usually, the area of the side surface of the vertically wound electrode assembly 17A in the Y direction is smaller than the bottom surface area of the horizontally wound electrode assembly 17B. Therefore, when the electrode assembly 17 is viewed from the winding axis direction (the horizontal direction in the case of a vertically wound type and the vertical direction in the case of a horizontally wound type), the vertically wound electrode assembly 17A has a smaller geometrical cross-sectional area where the electrolyte solution 23 flows in and out of the electrode assembly 17 than the horizontally wound electrode assembly 17B. Therefore, it takes a long time to recover the amount of retained electrolyte solution in the electrode assembly. Further, when a high compression force is applied, the distance between the positive electrode plate and the negative electrode plate is reduced, and hence the time required to recover the amount of retained electrolyte solution in the electrode assembly becomes longer. Therefore, because the amount of electrolyte solution that flows in and out of the vertically wound electrode assembly 17A on which a high compression force is applied is structurally small, the time required to recover the electrolyte solution retention amount in the electrode assembly becomes longer.

Further, when a high compression force is applied to the battery cell 11, the pressure distribution tends to be non-uniform in the vertically wound type. When the pressure distribution becomes non-uniform, the distribution of the electrolyte solution 23 also becomes non-uniform. It is considered that the reason why the pressure distribution becomes non-uniform is that wrinkles are generated in the electrode assembly 17 when a high compression force is applied. According to the investigation by the inventors of the present application, there is a difference between the vertically wound type and the horizontally wound type in how wrinkles (the wrinkle shape, the number of wrinkles, and the like) of the electrode assembly 17 are generated when a high compression force is applied. It is considered that due to the difference, the pressure distribution becomes non-uniform in the vertically wound type, and the amount of retained electrolyte solution in the electrode assembly also becomes non-uniform.

As described above, the vertically wound type has a small amount of retained electrolyte solution, and also has a non-uniform distribution of the electrolyte solution 23 when a high compression force is applied, so that ion concentration gradient is likely to occur. For this reason, the vertically wound type has a long suspension time required to recover the charging capacity accompanying the suspension of charging/discharging.

In contrast to this, the horizontally wound type has a large amount of retained electrolytic solution and the electrolyte solution 23 is uniformly distributed, and the ion concentration gradient is suppressed as compared with the vertically wound type. For this reason, the horizontally wound type has a short suspension time required to recover the charging capacity accompanying the suspension of charging/discharging as compared with the vertically wound type.

(4-3) Experimental Results

The results of the experiment conducted by the inventors of the present application in order to verify the above-mentioned two hypotheses will be described with reference to FIGS. 10 and 11. The inventors of the present application, based on the above-mentioned two hypotheses, conducted the experiment of repeating charging, suspending, discharging, and suspending in a plurality of suspension times (300 sec., 3 hr., 6 hr., 12 hr., and, 24 hr.) with respect to each of four types described above. In this experiment, the temperature of the battery cell 11 was 60° C., SOC was 0% to 100%, charging current was 2 C(A), and discharging current was 2 C(A). In the following description, this experiment is called a cycle test.

Figure 10:
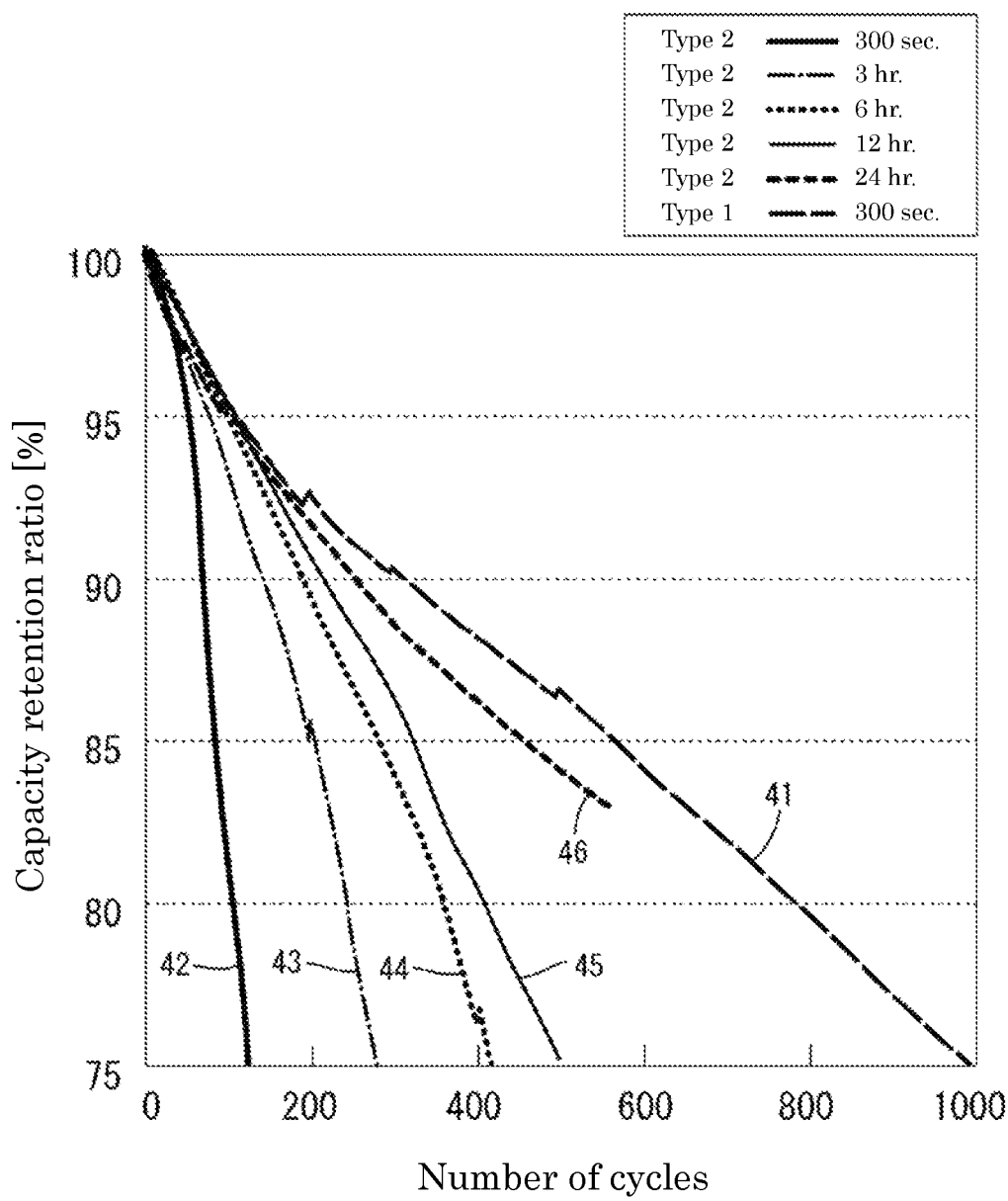
FIG. 10 is a plot showing the results of a cycle test on a battery cell incorporating the vertically wound electrode assembly.

FIG. 10 shows the results of a cycle test performed on the vertically wound battery cells 11 (type 1 and type 2). In FIG. 10, the horizontal axis represents the number of cycles when charging, suspending, discharging, and suspending constitute one cycle, and the vertical axis represents the capacity retention ratio. The capacity retention ratio refers to the ratio of the charging capacity of the battery cell 11 after the start of use to the charging capacity of the battery cell 11 when not in use. The capacity retention ratio is one index indicating the deterioration state of the battery cell 11.

In FIG. 10, a plot 41 shows a change in the capacity retention ratio of the battery cell 11 of type 1 (low compression vertically wound type) when the suspension time is 300 sec. Plots 42 to 46 show changes in the capacity retention ratio of the battery cells 11 of type 2 (high compression vertically wound type) for each suspension time. Specifically, the plot 42 shows the change in the capacity retention ratio when the suspension time is 300 sec., the plots 43, when the suspension time is 3 hr., the plot 44, when the suspension time is 6 hr., the plot 45, when the suspension time is 12 hr., and the plot 46, when the suspension time is 24 hr.

As can be seen from FIG. 10, the capacity retention ratio decreased slowly when the low compression battery cell 11 (type 1) had a short suspension time of 300 sec. as compared when the high compression battery cell 11 (type 2) had a suspension time of 24 hr. That is, the result affirms Hypothesis 1 (the low compression type has a shorter suspension time required for recovery of the charging capacity than the high compression type).

Figure 11:
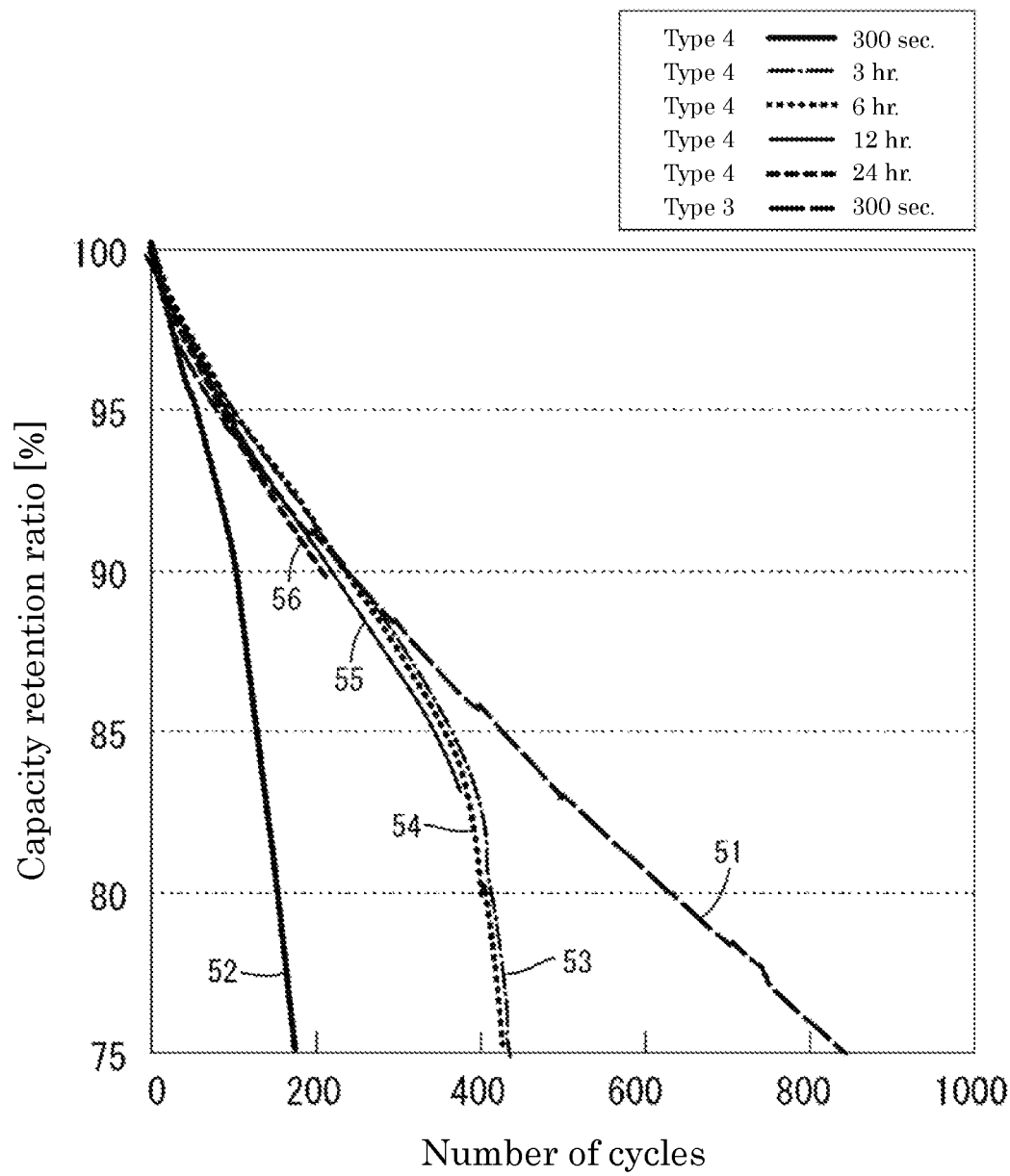
FIG. 11 is a plot showing the results of a cycle test on a battery cell incorporating the horizontally wound electrode assembly.

FIG. 11 shows the results of a cycle test performed on the horizontally wound battery cells 11 (type 3 and type 4). In FIG. 11, a plot 51 shows a change in the capacity retention ratio of the battery cell 11 of type 3 (low compression horizontally wound type) when the suspension time is 300 sec. Plots 52 to 56 show changes in the capacity retention ratio of the battery cells 11 of type 4 (high compression horizontally wound type) for each suspension time. Specifically, the plot 52 shows the change in capacity retention ratio when the suspension time is 300 sec. (5 min.); the plot 53, when the suspension time is 3 hr.; the plot 54, when the suspension time is 6 hr.; the plot 55, when the suspension time is 12 hr.; and the plot 56, when the suspension is 24 hr.

As can be seen from FIG. 11, the capacity retention ratio decreased slowly when the low compression battery cell 11 (type 3) had a short suspension time of 300 sec. as compared when the high compression battery cell 11 (type 4) had a suspension time of 24 hr. That is, the horizontally wound type also affirms Hypothesis 1.

As can be seen by comparing FIG. 10 and FIG. 11, in the case of the high compression battery cells 11 (type 2 and type 4), the horizontally wound type decreases in capacity retention ratio more slowly than the vertically wound type. That is, the result affirms Hypothesis 2 (the horizontally wound type has a shorter suspension time required for recovery of the charging capacity than the vertically wound type).

Since the result of the cycle test was a result affirming the inventor's hypotheses, the inventor's hypotheses were valid.

(5) Charge Control

The low compression type has a shorter suspension time required for recovery of the charging capacity than the high compression type. If the target number of charge/discharge cycles (in other words, the target number of cycles) that can be charged and discharged before the battery cell 11 reaches the end of its life is the same between the high compression type and the low compression type, the low compression type can achieve the target number with a shorter suspension time than the high compression type. For this reason, in the case of the low compression type, it is desirable to make the suspension time shorter than that of the high compression type in order to improve the convenience for the driver.

Similarly, in the case of the high compression type, the horizontally wound type has a shorter suspension time required to recover the charging capacity than the vertically wound type. Therefore, the suspension time of the horizontally wound type is desirable to be shorter than that of the vertically wound type to improve the convenience for the driver.

In this embodiment, a desired suspension time is determined in advance for each type of battery cell 11 and stored in the ROM of the battery charger 1, and the battery cell 11 is started to be charged with a suspension time corresponding to the type of battery cell 11. The details of this operation will be described below.

(5-1) Determination of Suspension Time

It is assumed that the life of the battery cell 11 comes to an end when the capacity retention ratio is reduced to 75%, and the target number of times that the battery can be charged and discharged is 400 before reaching the life. In this case, as can be seen from FIGS. 10 and 11, in the case of type 1 (low compression vertically wound type) and type 3 (low compression horizontally wound type), the suspension time may be 300 sec. or more. Similarly, in the case of type 2 (high compression vertically wound type), the suspension time may be 6 hr. or more, and in the case of type 4 (high compression horizontally wound type), the suspension time may be 3 hr. or more.

Therefore, for type 1 and type 3, a suspension time of 300 sec. is stored in ROM of the battery charger 1; for type 2, a suspension time of 6 hr. is stored in the ROM; and for type 4, a suspension time of 3 hr. is stored in the ROM. These suspension times are examples, and the suspension times are not limited to these.

(5-2) Charge Control Process

Figure 12:
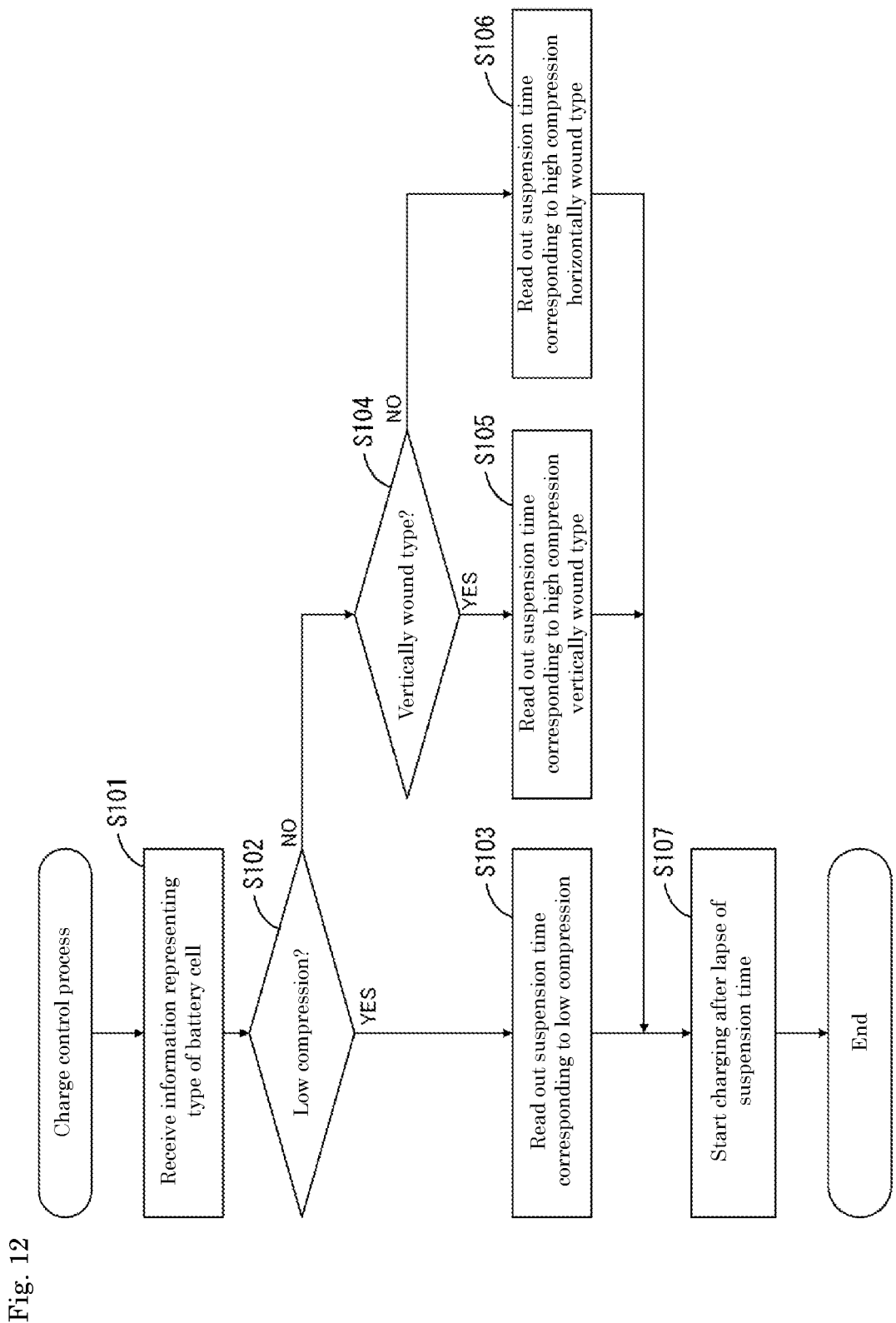
FIG. 12 is a flowchart of a charge control process.

A charge control process executed by the control unit 31 of the battery charger 1 will be described with reference to FIG. 12. This process is started when the charging connector 32 is connected to the vehicle 2.

Assume that the ECU of the vehicle 2 stores information representing the type of battery cell 11 included in the battery 3 mounted on the vehicle 2 (an example of information pertaining to performance recovery accompanying the suspension of charging/discharging of an energy storage device). In this case, as information representing the type of battery cell 11, information representing the magnitude of the compression force of the battery cell 11 (an example of information pertaining to the compression force that compresses the energy storage device) and information representing whether the battery cell 11 is of a vertically wound type or horizontally wound type (an example of information pertaining to the type of electrode assembly incorporated in the energy storage device) will be exemplarily described.

In S101, the control unit 31 makes a request to the ECU of the vehicle 2 via the charging connector 32 to send the information representing the type of battery cell 11 (the information representing the magnitude of the compression force of the battery cell 11, and information representing whether the battery cell 11 is of a vertically wound type or of the horizontally wound type), and receives the information from the ECU (an example of a step of acquiring information pertaining to performance recovery).

In S102, the control unit 31 determines the magnitude of the compression force of the battery cell 11 based on the information representing the magnitude of the compression force of the battery cell 11. If the compression force is low, the process advances to step S103. If the compression force is high, the process advances to step S104.

In S103, the control unit 31 reads the suspension time (that is, 300 sec.) corresponding to the low compression from the ROM (an example of step of acquiring information pertaining to the suspension time). The read suspension time is an example of information pertaining to the suspension time.

In S104, the control unit 31 determines whether the battery cell 11 is of a vertically wound type or horizontally wound type based on information representing whether the battery cell 11 is of the vertically wound type or horizontally wound type. If the battery cells 11 is of the vertically wound type, the process advances to S105. If the battery cells 11 is of the horizontally wound type, the process advances to S106.

In S105, the control unit 31 reads the suspension time (that is, 6 hr.) corresponding to the high compression vertically wound type from the ROM (an example of a step of acquiring information pertaining to the suspension time). The read suspension time is an example of information pertaining to the suspension time.

In S106, the control unit 31 reads the suspension time (that is, 3 hr.) corresponding to the high compression horizontally wound type from the ROM (an example of a step of acquiring information pertaining to the suspension time). The read suspension time is an example of information pertaining to the suspension time.

In S107, the control unit 31 starts charging the battery cell 11 when the elapsed time from the end of discharging the battery cell 11 reaches the suspension time read from the ROM (an example of a step of starting charging of the energy storage device). The driver may connect the charging connector 32 after a while after stopping the vehicle 2. Therefore, it is preferable that the control unit 31 receive, for example, the time when the battery cell 11 has finished discharging from the ECU of the vehicle 2 and uses the received time as the starting point of the suspension time.

The step of acquiring information pertaining to the suspension time and the step of controlling charging of the energy storage device are examples of the step of controlling charging of the energy storage device.

(6) Effects of Embodiment

According to the battery charger 1 of the first embodiment, the information representing the type of battery cell 11 is received from the ECU of the vehicle 2, and the suspension time according to the type represented by the received information is read from the ROM. This makes it possible to determine an appropriate suspension time according to the type of battery cell 11. Therefore, according to the battery charger 1, the charge control of the battery cell 11 can be appropriately performed according to the type of battery cell 11.

According to the battery charger 1, the suspension time is determined based on the information pertaining to the compression force that compresses the battery cell 11, so that the charge control of the battery cell 11 can be appropriately performed according to the compression force of the battery cell 11.

According to the battery charger 1, the suspension time is determined based on the information pertaining to the form (type) of the electrode assembly 17, so that the charge control of the battery cell 11 can be appropriately performed in accordance with the amount of retained electrolyte solution Because the type of electrode assembly 17 has a correlation with the amount of retained electrolyte solution, the information pertaining to the type of electrode assembly 17 can be replaced with the information pertaining to the amount of retained electrolyte solution.

According to the battery charger 1, the charge of the battery cell 11 (in other words, control pertaining to the energy storage device) can be appropriately performed according to the type of battery cell 11.

Second Embodiment

The second embodiment will be described with reference to FIG. 13 or 14.

The above-described first embodiment has exemplified the case in which the charging of the battery cell 11 is started at the timing when the elapsed time from the time when the battery cell 11 stops discharging reaches the suspension time read from the ROM. In contrast to this, in the second embodiment, the timing at which the suspension time has elapsed (in other words, the timing at which charging starts) is determined from the index (an example of information pertaining to the suspension time) correlated with the suspension time.

Figure 13:
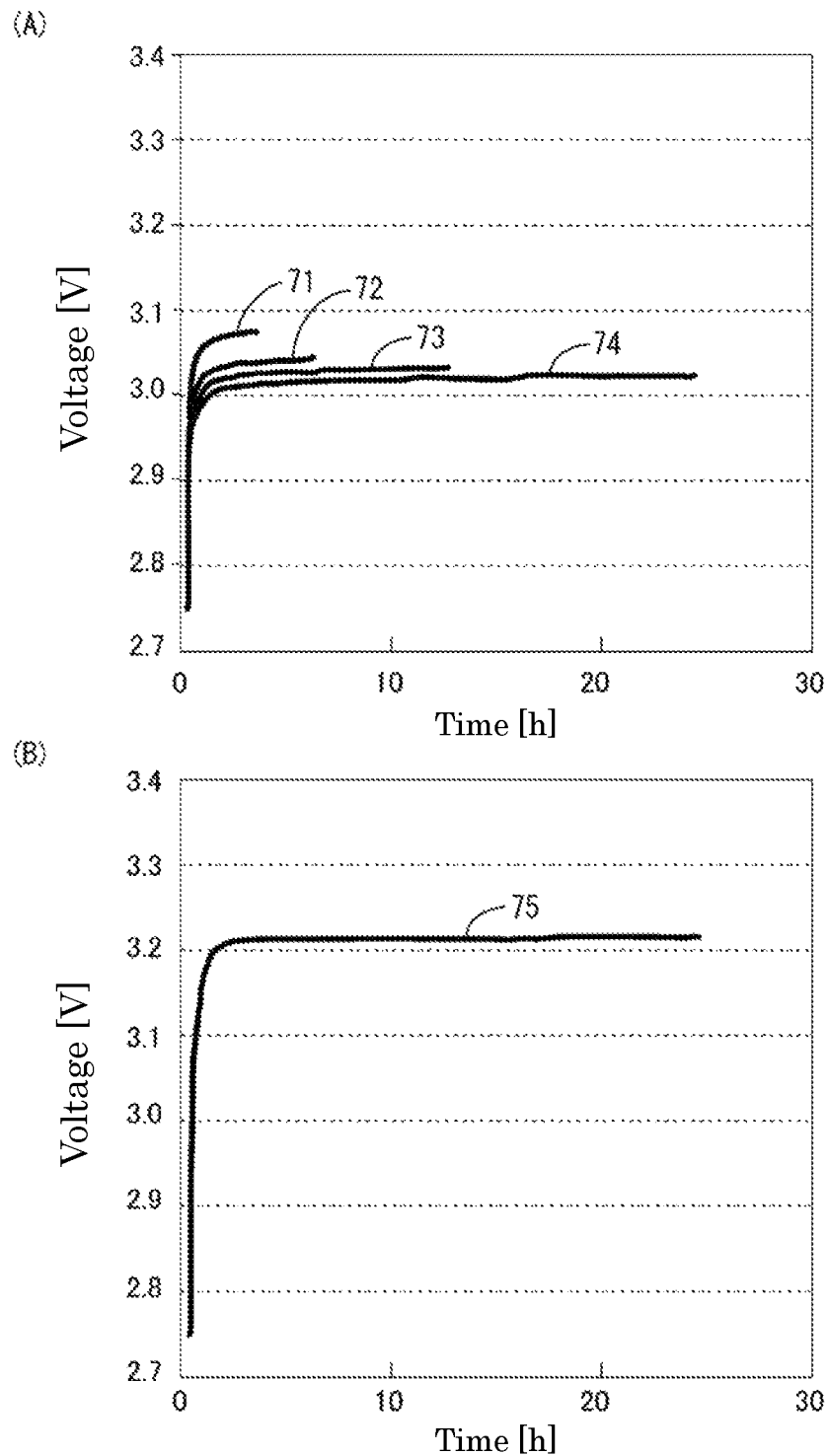
FIG. 13(A) is a plot showing voltage recovery during suspension of charging/discharging of the battery cell incorporating the vertically wound electrode assembly.
FIG. 13(B) is a plot showing voltage recovery during suspension of charging/discharging of the battery cell incorporating the horizontally wound electrode assembly.

FIGS. 13 and 14 show the results of measuring the recovery of the voltage of the battery cell 11 after discharging the battery cell 11 under high compression (type 2 or type 4) in the cycle test described in the first embodiment.

FIG. 13(A) shows the relationship between the elapsed time and the voltage when the suspension time after discharging is 3 hr., 6 hr., 12 hr., and 24 hr. for the battery cell 11 of type 2 (high compression vertically wound type). Specifically, a plot 71 shows the relationship between the elapsed time and the voltage when the suspension time is 300 sec.; a plot 72 shows the relationship when the time is 6 hr.; a plot 73 shows the relationship when the time is 12 hr.; and a plot 74 shows the relationship when the time is 24 hr.

FIG. 13(B) shows the relationship between the elapsed time and the voltage when the suspension time after discharging is 3 hr., 6 hr., 12 hr., and 24 hr. for the battery cell 11 of type 4 (high compression horizontally wound type). In Type 4, because the relationship between the elapsed time and the voltage recovery was almost the same for all the suspension times, a plot 75 collectively show the relationships in FIG. 13(B).

FIG. 14 shows the recovery speed of the voltage, the time required for the recovery, and the like for each suspension time for the battery cells 11 of type 2 and type 4. Specifically, in FIG. 14, t represents a suspension time, V0 represents a voltage immediately after discharge (t=0), Vt represents a voltage after the lapse of the time t, ΔV represents a voltage difference (=Vt−V0), ΔV/t represents an amount of voltage recovery per unit time (in other words, recovery speed), 0.8ΔV represents a voltage of 80% of ΔV, and t0.8ΔV represents a time required for the voltage to recover to 80% of ΔV. Here, because the voltage recovery becomes slower with time, ΔV/t also decreases with time.

As can be seen from FIG. 13(A), in the case of type 2, it seems that the voltage suddenly rises and stabilizes in a short time in any of the suspension times. However, as can be seen from FIG. 14, Vt, ΔV, ΔV/t, 0.8ΔV, and t0.8ΔV differ depending on the suspension time. Because all of these indices correlate with time, whether or not the suspension time has elapsed (in other words, whether or not to start charging) may be determined from these indices.

For example, when the target number of times charge/discharge can be performed before the battery cell 11 reaches the end of its life is assumed to be 400, it is desirable that the battery cell 11 of type 2 have a suspension time of 6 hr. or more. When the suspension time is 6 hr., Vt is 3.039 V, ΔV is 289 mV, and ΔV/t is 0.80. For this reason, in the case of type 2, charging may be started by assuming that 6 hr. have passed when the voltage reaches 3.039 V, or charging may be started by assuming that 6 hr. have passed when ΔV reaches 289 mV. Alternatively, charging may be started when ΔV/t drops to 0.80.

Charging may be started when the voltage recovers to 80% of ΔV. In that case, charging may be started when ΔV reaches 231 mV, or charging may be started after 539 sec. have elapsed.

As can be seen from FIG. 13(B), in the case of type 4 as well, it seems that the voltage suddenly rises and stabilizes in a short time in any of the suspension times. However, as can be seen from FIG. 14, in the case of type 4, although ΔV is almost the same, ΔV/t and t0.8ΔV differ depending on the suspension time.

For example, when the target number of times charge/discharge can be performed before the end of life is reached is assumed to be 400, it is desirable that the battery cell 11 of type 4 have a suspension time of 3 hr. or more. When the suspension time is 3 hr., ΔV is 462 mV and ΔV/t is 2.56. For this reason, in the case of type 4, charging may be started by assuming that 3 hr. have passed when ΔV reaches 462 mV or charging may be started when ΔV/t drops to 2.56.

In the case of type 4 as well, charging may be started when the voltage recovers to 80% of ΔV. In this case, charging may be started when ΔV reaches 369 mV or charging may be started after 974 sec.

According to the battery charger 1 of the second embodiment, charging of the battery cell 11 can be started when a time close to the suspension time according to the type of battery cell 11 has elapsed.

Third Embodiment

Figure 15:
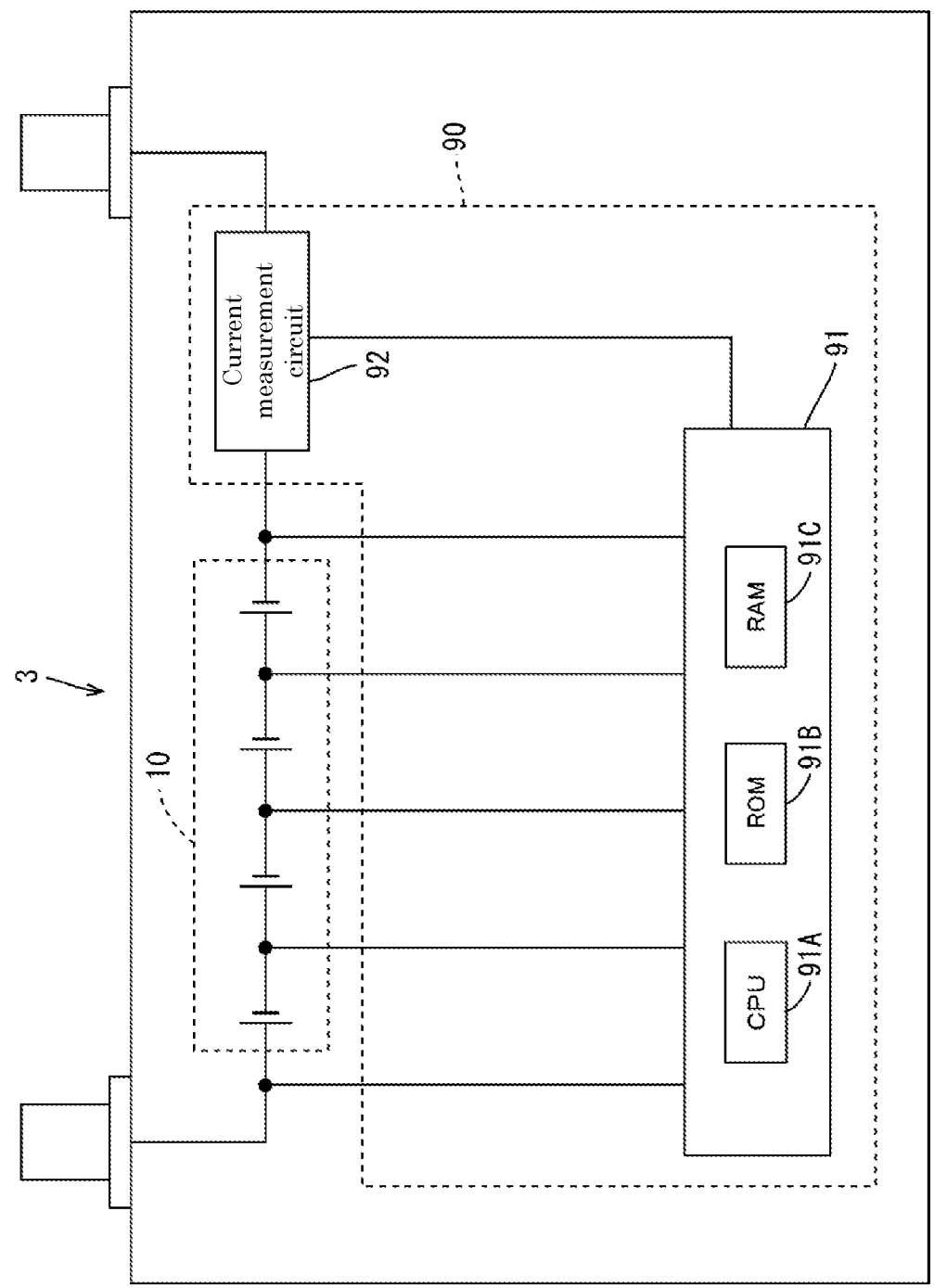
FIG. 15 is a block diagram showing an electrical configuration of a battery according to a third embodiment.

The third embodiment will be described with reference to FIG. 15.

The first embodiment described above has exemplified the case in which the suspension time is determined based on information representing the type of battery cell 11. In contrast to this, in the third embodiment, the capacity retention ratio (an example of the state) of the battery cell 11 is estimated based on information representing the type of battery cell 11.

(1) Electrical Configuration of Battery

An electrical configuration of a battery 3 according to the third embodiment will be described with reference to FIG. 15. The battery 3 includes a battery module 10 and a battery management apparatus (Battery Management System (BMS)) 90 that manages the battery module 10. The BMS 90 is an example of an energy storage device management apparatus.

The BMS 90 includes a management unit 91 and a current sensor 92. The management unit 91 operates by electric power supplied from the battery module 10, and includes a CPU 91A, a ROM 91B, and a RAM 91C. The ROM 91B is a rewritable non-volatile storage medium, and stores a management program for managing the battery 3, information representing the type of battery cell 11, cycle test data representing the result of the cycle test shown in FIGS. 10 and 11, and the like.

The current sensor 92 is provided in series with the battery module 10. The current sensor 92 measures a current value I[A] of a charging current flowing from the battery charger or the alternator of the vehicle to the battery module 10 during charging and the current value I[A] of a discharging current flowing from the battery module 10 to the vehicle during discharging, and outputs the measured current values to the management unit 91. The management unit 91 can detect the suspension of charging/discharging of the battery cell 11 by monitoring the current values I[A].

(2) Estimation of Deterioration State

The management unit 91 of the BMS 90 stores, in the ROM 91B, the cumulative number of times of charge and discharge since the start of use of the battery cell 11 and the suspension time after charge and discharge as history information, and estimates a deterioration state by specifying the capacity retention ratio of the battery cell 11 based on the information stored in the ROM 91B and information stored in advance in the ROM 91B (information representing the type of battery cell 11, cycle test data, and the like) (an example of state estimation).

Specifically, the management unit 91 first reads information representing the type of battery cell 11 from the ROM 91B (an example of a step of acquiring information pertaining to performance recovery). Then, assuming that the type of battery cell 11 is, for example, of a high compression and a vertically wound type, the management unit 91 reads out, from the ROM, cycle test data representing a plot, of plots 42 to 46 shown in FIG. 10, which corresponds to the past average suspension time. For example, if the average past suspension time is 3 hr., cycle test data representing the plot 43 is read.

Then, the management unit 91 estimates a deterioration state by specifying the capacity retention ratio corresponding to the cumulative number of times of charge and discharge from the read cycle test data (an example of the step of estimating the state of the energy storage device). For example, assuming that the cumulative number of times of charge and discharge is 200 times, the capacity retention ratio corresponding to 200 times on the plot 43 shown in FIG. 10 is about 85%, so the deterioration state is estimated to be 85%.

According to the BMS 90 of the third embodiment, the deterioration state of the battery cell 11 (in other words, the state of the energy storage device) can be appropriately estimated according to the type of battery cell 11.

Other Embodiments

The technology disclosed in this specification is not limited to the above-described embodiment, and includes various aspects such as the following.

(1) In the above embodiment, the information representing the type of battery cell 11 is described as an example of the information pertaining to the performance recovery accompanying the suspension of charging/discharging of the energy storage device. However, the information pertaining to the performance recovery is not limited to this, and any information can be used as long as it makes it possible to determine accurately, to some extent, the time required for the performance recovery accompanying the suspension of charging/discharging of the battery cell 11.

(2) The above-described embodiment has exemplified, as information representing the type of battery cell 11, information pertaining to the compression force that compresses the battery cell 11 and information pertaining to the type of electrode assembly 17 (the amount of retained electrolyte solution) incorporated in the battery cell 11. However, the information representing the type of battery cell 11 is not limited to these.

For example, when the type of battery cell 11 can be indirectly specified from the manufacturer, the product type, the product shipment time, and the like of the battery cell 11 (battery 3), the information representing the type of battery cell 11 may be such information. When the type of battery cell 11 varies depending on the manufacturer, the manufacturer and the type of battery cell 11 may be stored in the ROM of the battery charger 1 in association with each other. The information representing the manufacturer of the battery cell 11 may be received from the vehicle 2, and the type corresponding to the manufacturer represented by the received information may be read from the ROM. The same applies to product types, product shipment times, and the like.

(3) The above-described embodiment has exemplified the information representing the magnitude of the compression force as information pertaining to the compression force that compresses the battery cell 11. However, the information pertaining to the compression force is not limited to this.

For example, the information pertaining to the compression force may be information that directly represents the compression force by a numerical value or information that represents the presence or absence of compression.

If there is a high compression type battery module 10 in which the plurality of battery cells 11 are compressed with high compression force and a low compression type battery module 10 in which a plurality of battery cells 11 are compressed with low compression force, the information pertaining to the compression force may be the type of module.

The information pertaining to the compression force may be information representing the material of the restraining portion 13. Specifically, depending on the battery module 10, the restraining portion 13 may be made of resin. When the restraining portion 13 is made of resin, the compression force is smaller than that of metal, so that when the restraining portion 13 is made of resin, the suspension time may be shorter than when the restraining portion 13 is made of metal.

When the information pertaining to the compression force can be indirectly specified from the manufacturer, the product type, the product shipment time, and the like of the battery cell 11 (battery 3), the information pertaining to the compression force may be such information.

(4) The above-described embodiment has exemplified the information representing whether the battery cell 11 is of the vertically wound type or the horizontally wound type as the information pertaining to the type of electrode assembly 17 (in other words, the information pertaining to the amount of retained electrolyte solution). However, the information pertaining to the type of electrode assembly 17 is not limited to this.

For example, the information pertaining to the type of electrode assembly 17 may be information that directly represents the amount of retained electrolyte solution by a numerical value or information that represents the magnitude of the amount of retained electrolyte solution.

The information pertaining to the type of electrode assembly 17 may be the mounting form of the current collector (one side or both sides). For example, the positive electrode current collector 19P shown in FIG. 5 has a pair of opposite walls formed thereon, and the pair of opposite walls provided on the positive electrode current collector 19P are welded to the positive electrode current collector foil 22P of the electrode assembly 17 from the X direction. Therefore, the mounting form of the positive electrode current collector 19P is of the both-sided type. In contrast to this, the positive electrode current collector 19P welded to only one side of the positive electrode current collector foil 22P in the X direction is sometimes used. In that case, the mounting form of the current collector is of a one-sided type. The same applies to the negative electrode current collector 19N.

The inventors of the present application has found that the one-sided type has a shorter time required to recover the charging capacity than the both-sided type. It is considered that this is because the one-sided type and the both-sided type differ in the shape and the number of wrinkles generated in the electrode assembly 17 when exposed to a high compression, and are influenced by the differences.

When the type of electrode assembly 17 can be indirectly specified from the manufacturer, the product type, the product shipment time, and the like of the battery cell 11 (battery 3), the information representing the type of electrode assembly 17 may be such information.

(5) The above embodiment has exemplified the degree of compression of the battery cell 11 or the form of the electrode assembly 17 as the viewpoint of classifying the battery cells 11. However, the viewpoint of classifying the battery cells 11 is not limited to such information as long as it pertains to the performance recovery of the battery cells 11.

For example, the viewpoint of classifying the battery cells 11 may be a negative electrode material (soft carbon, hard carbon, or silicon). Soft carbon expands more easily than hard carbon, and hence it takes longer suspension time to recover its performance than hard carbon. Therefore, when the negative electrode material contains soft carbon, the suspension time may be longer than that when the negative electrode material contains hard carbon.

Because the electrode assembly 17 containing silicon (Si) or silicon oxide (SiO) in the negative electrode material has a property of being more easily swollen than soft carbon, a longer suspension time may be set when silicon is contained than when hard carbon or soft carbon is contained.

The viewpoint of classifying the battery cells 11 may be the expansion rate of the battery cells 11. The expansion rate of the battery cell 11 can be specified by an experiment. When the expansion rate is small, the compression force is smaller than when the expansion rate is large. Therefore, when the expansion rate is less than a reference value, the suspension time may be shorter than when the expansion rate is more than the reference value.

(6) The above-mentioned embodiment has exemplified the vertically wound type and the horizontally wound type each as the form of the electrode assembly 17, but the form of the electrode assembly 17 may be a stack type (in other words, a laminated type).

As shown in FIG. 16, the stack type electrode assembly 17 is configured by stacking a positive electrode plate and a negative electrode plate with a separator 21 interposed therebetween. The stack type electrode assembly 17 allows the electrolyte solution 23 to flow in and out of the electrode assembly 17 from the lower side and the left and right sides. Accordingly, the amount of retained electrolyte solution is greater than that of the vertically wound type that allows the electrolyte solution 23 to flow in and out only from the left and right sides and that of the horizontally wound type that allows the electrolyte solution 23 to flow in an out only from the lower side. The stack type, which is less likely to wrinkle or bend owing to its structure, also has the property of being less likely to expand than the vertical or horizontally wound type.

Therefore, the performance of the stack type is easier to recover than that of the horizontally wound type. According to estimation by the inventors of the present application, even if the suspension time of the stack type is 300 sec., it is expected that type 4 described above (low compression horizontally wound type) has performance recovery similar to that when the suspension time is 24 hr. Therefore, the stack type may have a shorter suspension time than the vertically wound type or the horizontally wound type.

(7) The above-described embodiment has exemplified the case in which the control unit 31 of the battery charger 1 acquires information pertaining to the performance recovery accompanying the suspension of charging/discharging of the energy storage device by receiving the information from the ECU of the vehicle 2 via the communication unit (charging connector 32). However, the method of acquiring information pertaining to performance recovery is not limited to this. For example, the information may be acquired by receiving information pertaining to performance recovery from the driver via the operation unit 33 of the battery charger 1, or may be received by wireless communication from a mobile terminal (a mobile phone, a tablet computer, or the like).

(8) The first embodiment described above has exemplified the battery charger 1 that charges the battery cells 11 included in the battery 3 mounted on the vehicle 2 as a battery charger, but the battery charger is not limited to this. For example, the battery charger may be one that charges the battery cell 11 used as an industrial or domestic energy storage system.

(9) The third embodiment described above has exemplified the BMS 90 that manages the battery cells 11 included in the battery 3 mounted on the vehicle 2 as a management apparatus for the energy storage device, but the BMS 90 is not limited to this. For example, the BMS 90 may be one that manages the battery cell 11 used as an industrial or domestic power storage system.

The energy storage device management apparatus may remotely manage the energy storage device. For example, the information (current, voltage, and temperature) about the energy storage device acquired by a sensor arranged close to the energy storage device is transmitted to the server device via communication (via the network). The server device can estimate the state of the energy storage device based on the information pertaining to performance recovery accompanying suspension of charging/discharging of the energy storage device and the information acquired by the sensor.

(10) The above-described embodiment has exemplified the case in which the information pertaining to the performance recovery accompanying the suspension of charging/discharging of the energy storage device is used for the determination of the suspension time and the estimation of the deterioration state. However, the use of the information pertaining to the performance recovery is not limited to this and can be used for arbitrary applications. For example, information pertaining to performance recovery may be used to determine a charge voltage, charge rate, and discharge rate. The determination of a charge voltage and a charging rate is an example of charge control, and the determination of a discharge rate is an example of discharge control.

Information pertaining to performance recovery may be used to estimate the life of the energy storage device. For example, the soundness of the energy storage device at a given time is estimated based on the information pertaining to the performance recovery of the energy storage device in use (the energy storage device to be analyzed) and the information acquired from the energy storage device by the sensor. Based on the estimated current soundness and the expected usage pattern of the energy storage device in the future (for example, the SOC fluctuation pattern, charge/discharge rate, and environmental temperature), it is estimated how long the energy storage device will be used in the assumed usage pattern before the device will reach EoL (an example of the step of estimating the life of the energy storage device).

For the energy storage device in the development stage, the design and development of the energy storage device may be performed based on the information pertaining to the performance recovery accompanying the suspension of charging/discharging of the energy storage device and the expected usage pattern of the energy storage device (so-called model-based development).

At the stage of designing an energy storage system (for example, at the stage of proposing to the customer), the energy storage system may be designed (an example of the step of designing the energy storage system) and manufactured based on the information pertaining to the performance recovery accompanying the suspension of charging/discharging of the energy storage device and the expected usage pattern of the energy storage device. In designing a large-scale energy storage system using a large number of energy storage devices, a more compact and inexpensive energy storage system can be implemented by determining the number of energy storage devices required to satisfy the system requirements and constructing a control system in consideration of information pertaining to the performance recovery accompanying the suspension of charging/discharging of the energy storage devices.

(11) The above embodiment has exemplified the case in which the information pertaining to performance recovery accompanying the suspension of charging/discharging of the energy storage device is acquired. However, the information representing the type of battery cell 11 may be acquired. The information representing the type of battery cell 11 here is not limited to the information pertaining to the performance recovery.

For example, when the battery charger 1 changes the control of charging depending on the type of electrolyte solution of the battery cell 11, the information representing the type of battery cell 11 may be information representing the type of electrolyte solution. The type of electrolyte solution includes types of electrolyte, solvent, and additive, constituent ratios, and concentrations. The type of electrolyte solution includes not only a solution state but also solid electrolyte and gel states, and is not limited to any of the three states of matter.

In other words, the ECU of the vehicle 2 (or the battery management apparatus 90 of the battery cell 11) may actively inform an external device such as the battery charger 1 of the information representing the type of battery cell 11 mounted on the vehicle 2. Further, the battery management apparatus 90 of the battery cell 11 may provide information to another ECU mounted in the vehicle, and the ECU may perform some control using the information.

(12) The above embodiment has exemplified the case in which the suspension time is fixed for each type of battery cell 11. However, because the deterioration rate of the battery cell 11 may become slower when charging and discharging are repeated, the suspension time is determined as described in the first embodiment until the deterioration progresses to some extent. When the deterioration progresses to some extent, a suspension time different from that before the deterioration progresses to some extent (for example, a shorter suspension time than before the deterioration progresses to some extent) may be used. This makes it possible to appropriately determine a suspension time according to the deterioration of the battery cell 11.

Whether or not the deterioration of the battery cell 11 has progressed to some extent can be determined by various methods. For example, it may be judged from the number of times of charging (or which may be the number of times of discharging, the number of times of charging/discharging, the number of cycles, or the like), the soundness (SOH), or the capacity retention ratio. Alternatively, it may be judged from the elapsed time from the start of use (BoL).

The suspension time after the deterioration has progressed to some extent may differ depending on the type of battery cell 11 or may be the same regardless of the type. When the suspension time after the deterioration has progressed to some extent is the same regardless of the type of battery cell 11, there are the following advantages.

The driver of the vehicle 2 is recommended to charge the battery cell 11 with the battery charger 1 described in the above embodiment in order to start charging with a suspension time according to the type of battery cell 11 until the deterioration of the battery cell 11 progresses to some extent. However, in some cases, the battery charger 1 described in the above embodiment is not nearby. If the suspension time after the deterioration of the battery cells 11 progresses to some extent is the same regardless of the type of battery cell 11, the battery cell 11 can be charged with a battery charger (i.e., a battery charger that does not determine the suspension time depending on the type of battery cell) other than the battery charger 1 described in the above embodiment after the deterioration of the battery cell 11 has progressed to some extent. Accordingly, it becomes possible to use battery chargers installed in various places instead of the battery charger 1 according to the first embodiment. This improves the convenience for the driver.

(13) The above embodiment has exemplified the secondary battery as the battery cell 11, but the battery cell 11 may be a capacitor.

DESCRIPTION OF REFERENCE SIGNS

11: battery cell (example of energy storage device)
17: electrode assembly
23: electrolyte solution
31: control unit
32: charging connector (example of acquisition unit)
90: battery management apparatus (example of management apparatus)

The invention claimed is:

1. A method for acquiring information of an energy storage device, comprising a step of acquiring information pertaining to performance recovery accompanying suspension of charging/discharging of the energy storage device,
    wherein the information pertaining to the performance recovery includes information pertaining to a type of electrode assembly incorporated in the energy storage device.

2. The method for acquiring information of an energy storage device according to claim 1, wherein the information pertaining to the performance recovery further includes information pertaining to a compression force that compresses the energy storage device.

3. A method for controlling charging of an energy storage device, comprising:
    a step of acquiring information pertaining to performance recovery accompanying suspension of charging/discharging of the energy storage device;
    a step of acquiring information pertaining to a suspension time until charging is started after the energy storage device is discharged based on the information pertaining to the performance recovery; and
    a step of causing the battery charger to start charging the energy storage device after a suspension time, which corresponds to the information pertaining to the suspension time acquired in the step of acquiring, has elapsed since the energy storage device is discharged,
    wherein the information pertaining to the performance recovery includes information pertaining to a compression force that compresses the energy storage device.

4. The method for controlling charging of an energy storage device according to claim 3, further comprising changing the suspension time according to deterioration of the energy storage device.

5. An energy storage device state estimation method comprising:
   the method for controlling charging of an energy storage device according to claim 3; and
   a step of estimating a state of the energy storage device based on information pertaining to the performance recovery.

6. An energy storage device life estimation method comprising:
   the method for controlling charging of an energy storage device according to claim 3; and
   a step of estimating a life of the energy storage device based on information pertaining to the performance recovery.

7. An energy storage system manufacturing method comprising:
   the method for controlling charging of an energy storage device according to claim 3; and
   a step of designing an energy storage system based on information pertaining to the performance recovery and an assumed usage pattern of the energy storage device.

8. An energy storage device management apparatus comprising:
   an acquisition unit that acquires information pertaining to performance recovery accompanying suspension of charging/discharging of the energy storage device; and
   a control unit that performs at least one of charge control, discharge control, state estimation, and life estimation of the energy storage device based on the information pertaining to the performance recovery acquired by the acquisition unit,
   wherein the information pertaining to the performance recovery includes information pertaining to a type of electrode assembly incorporated in the energy storage device.

9. The method for controlling charging of an energy storage device according to claim 3, wherein
   the information pertaining to the compression force includes information whether the energy storage device is exposed to high compression or low compression, and
   the suspension time for charging the energy storage device exposed to the low compression is shorter than the suspension time for charging the energy storage device exposed to the high compression.

10. The method for controlling charging of an energy storage device according to claim 3, wherein
    the information pertaining to the performance recovery further includes information pertaining to a type of electrode assembly incorporated in the energy storage device.

11. The method for controlling charging of an energy storage device according to claim 10, wherein
    the information pertaining to the type of electrode assembly includes information whether the energy storage device incorporates a vertically wound electrode assembly or a horizontally wound electrode assembly, and
    the suspension time for charging the energy storage device incorporating the horizontally wound electrode assembly is shorter than the suspension time for charging the energy storage device incorporating the vertically wound electrode assembly.

12. The method for controlling charging of an energy storage device according to claim 10, wherein
    the information pertaining to the type of electrode assembly includes information whether a mounting form of a current collector incorporated in the energy storage device is a one-sided type or a both-sided type, and
    the suspension time for charging the energy storage device with the mounting form of the one-sided type is shorter than the suspension time for charging the energy storage device with the mounting form of the both-sided type.

13. The method for controlling charging of an energy storage device according to claim 10, wherein
    the information pertaining to the type of electrode assembly includes information whether the energy storage device incorporates either one of a vertically wound electrode assembly, a horizontally wound electrode assembly or a stack type electrode assembly in which a positive electrode plate and a negative electrode plate are stacked with a separator interposed between the positive electrode plate and the negative electrode plate,
    the suspension time for charging the energy storage device incorporating the horizontally wound electrode assembly is shorter than the suspension time for charging the energy storage device incorporating the vertically wound electrode assembly, and
    the suspension time for charging the energy storage device incorporating the stack type electrode assembly is shorter than the suspension time for charging the energy storage device incorporating the vertically wound electrode assembly and the suspension time for charging the energy storage device incorporating the horizontally wound electrode assembly.

14. The method for controlling charging of an energy storage device according to claim 3, wherein
    the information pertaining to the performance recovery further includes information pertaining to a negative electrode material,
    the information pertaining to the negative electrode material includes information whether the negative electrode material of the energy storage device includes soft carbon or hard carbon, and
    the suspension time for charging the energy storage device including the negative electrode material containing soft carbon is shorter than the suspension time for charging the energy storage device including the negative electrode material containing hard carbon.

15. The method for controlling charging of an energy storage device according to claim 3, wherein
    the information pertaining to the performance recovery further includes information pertaining to a negative electrode material,
    the information pertaining to the negative electrode material includes information whether the negative electrode material of the energy storage device includes either one of soft carbon, hard carbon, or silicon,
    the suspension time for charging the energy storage device including the negative electrode material containing soft carbon is shorter than the suspension time for charging the energy storage device including the negative electrode material containing hard carbon, and
    the suspension time for charging the energy storage device including the negative electrode material containing silicon is shorter than the suspension time for charging the energy storage device including the negative electrode material containing hard carbon and the suspension time for charging the energy storage device including the negative electrode material containing soft carbon.

\* \* \* \* \*